United States Patent
Jo et al.

(10) Patent No.: US 11,327,446 B2
(45) Date of Patent: May 10, 2022

(54) METHOD OF CONFIGURING WATCH SCREEN AND WEARABLE ELECTRONIC DEVICE IMPLEMENTING SAME

(71) Applicant: Samsung Electronics Co., Ltd., Gyeonggi-do (KR)

(72) Inventors: Hankyung Jo, Seoul (KR); Yusic Kim, Gyeonggi-do (KR); Eunjoo Kim, Gyeonggi-do (KR); Jungah Seung, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 30 days.

(21) Appl. No.: 16/716,635

(22) Filed: Dec. 17, 2019

(65) Prior Publication Data
US 2020/0133206 A1     Apr. 30, 2020

Related U.S. Application Data

(63) Continuation of application No. 14/831,085, filed on Aug. 20, 2015, now abandoned.

(30) Foreign Application Priority Data

Aug. 25, 2014   (KR) .................. 10-2014-0110986

(51) Int. Cl.
*G04G 21/00*       (2010.01)
*G06F 3/04817*    (2022.01)
(Continued)

(52) U.S. Cl.
CPC .............. *G04G 21/00* (2013.01); *G04G 9/00* (2013.01); *G04G 9/0064* (2013.01);
(Continued)

(58) Field of Classification Search
CPC .. G06F 3/048; G06F 3/04817; G06F 3/04842; G06F 3/0488; G04G 9/00; G04G 21/00; G04G 9/0064
See application file for complete search history.

(56) References Cited

U.S. PATENT DOCUMENTS 6,188,648 B1    2/2001  Olsen
6,201,540 B1    3/2001  Gallup et al.
(Continued)

FOREIGN PATENT DOCUMENTS

EP    1 867 565 A2    12/2007
JP    2014-140145 A   7/2014
(Continued)

OTHER PUBLICATIONS

Korean Search Report dated Jan. 12, 2021.
European Search Report dated Jul. 2, 2021.

*Primary Examiner* — Jennifer N Welch
*Assistant Examiner* — Qi Wan
(74) *Attorney, Agent, or Firm* — Cha & Reiter, LLC

(57) ABSTRACT

Various embodiments of the present disclosure relate to a method of configuring a watch screen and a wearable electronic device implementing the same, which displays various pieces of information provided by an application, in an icon form, to enable a user to easily identify the information. A method of configuring a watch screen, the method comprising selecting one of a plurality of predetermined watch screens, thereby resulting in a selected watch screen; determining at least one icon of a plurality of predetermined icons as components of the selected watch screen; and displaying the selected watch screen, wherein the selected watch screen includes the at least one icon.

20 Claims, 20 Drawing Sheets

(51) Int. Cl.
*G04G 9/00* (2006.01)
*G06F 3/04842* (2022.01)
*G06F 3/0488* (2022.01)

(52) U.S. Cl.
CPC ........ *G06F 3/0488* (2013.01); *G06F 3/04817* (2013.01); *G06F 3/04842* (2013.01)

(56) References Cited

U.S. PATENT DOCUMENTS

| | | | |
|---|---|---|---|
| 6,477,117 | B1 | 11/2002 | Narayanaswami et al. |
| 6,525,997 | B1 | 2/2003 | Narayanaswami et al. |
| 8,253,586 | B1 | 8/2012 | Matak |
| 8,725,842 | B1 | 5/2014 | Al-Nasser |
| 8,854,925 | B1 * | 10/2014 | Lee ...................... G04G 9/0005 368/10 |
| 8,983,539 | B1 * | 3/2015 | Kim ....................... H04B 1/385 455/557 |
| 9,477,208 | B2 | 10/2016 | Lee et al. |
| 9,855,484 | B1 | 1/2018 | Matak |
| 2005/0009571 | A1 * | 1/2005 | Chiam ................ H04M 1/0243 455/566 |
| 2005/0216862 | A1 | 9/2005 | Shinohara et al. |
| 2005/0278757 | A1 | 12/2005 | Grossman et al. |
| 2006/0073851 | A1 | 4/2006 | Colando et al. |
| 2008/0168365 | A1 | 7/2008 | Chaudhri |
| 2008/0207274 | A1 * | 8/2008 | Kim .................. H04M 1/72544 455/566 |
| 2008/0218532 | A1 * | 9/2008 | Young ..................... G06F 9/451 345/660 |
| 2009/0051649 | A1 | 2/2009 | Rondel |
| 2009/0199130 | A1 * | 8/2009 | Tsern ....................... G06F 1/163 715/810 |
| 2010/0295789 | A1 * | 11/2010 | Shin ....................... G06F 1/1694 345/168 |
| 2011/0060988 | A1 | 3/2011 | Mysliwy et al. |
| 2011/0225549 | A1 * | 9/2011 | Kim .................... G06F 3/04817 715/838 |
| 2012/0079432 | A1 | 3/2012 | Lee et al. |
| 2012/0092383 | A1 | 4/2012 | Hysek et al. |
| 2012/0324390 | A1 | 12/2012 | Tao |
| 2013/0040610 | A1 * | 2/2013 | Migicovsky ............ H04W 4/80 455/412.2 |
| 2013/0201204 | A1 | 8/2013 | Li |
| 2013/0254705 | A1 * | 9/2013 | Mooring ............... G06F 3/0482 715/784 |
| 2013/0303087 | A1 * | 11/2013 | Hauser .................... H04W 4/21 455/41.2 |
| 2013/0303213 | A1 | 11/2013 | Kennard |
| 2013/0307762 | A1 * | 11/2013 | Ashbrook ................. G06F 3/13 345/156 |
| 2014/0059492 | A1 * | 2/2014 | Hashida ................ G06F 3/0482 715/835 |
| 2014/0101617 | A1 | 4/2014 | Yang et al. |
| 2014/0181183 | A1 * | 6/2014 | Houjou ............... H04M 1/7253 709/203 |
| 2014/0201655 | A1 | 7/2014 | Mahaffey et al. |
| 2014/0337748 | A1 | 11/2014 | Lee |
| 2014/0380239 | A1 | 12/2014 | Kang |
| 2015/0049591 | A1 | 2/2015 | Adams et al. |
| 2015/0350749 | A1 | 12/2015 | Pybus |
| 2016/0054892 | A1 | 2/2016 | Kim et al. |
| 2016/0253071 | A1 | 9/2016 | Mishra |

FOREIGN PATENT DOCUMENTS

| | | |
|---|---|---|
| KR | 10-0710247 B1 | 4/2007 |
| KR | 10-2014-0049740 A | 4/2014 |
| KR | 10-2014-0080416 A | 6/2014 |
| WO | 2011/031848 A2 | 3/2011 |

* cited by examiner

<501>

<502>

<503>

<504>

<601>

<602>

<603>

<604>

<605>

<606>

<801>

<802>

<803>

<804>

<805>

<806>

<807>

<901>

<902>

<903>

<904>

METHOD OF CONFIGURING WATCH SCREEN AND WEARABLE ELECTRONIC DEVICE IMPLEMENTING SAME

CROSS REFERENCE TO RELATED APPLICATIONS

This application is a Continuation of U.S. patent application Ser. No. 14/831,085 filed on Aug. 20, 2015 which claims priority from and the benefit under 35 U.S.C. § 119(a) of Korean Patent Application No. 10-2014-0110986, filed on Aug. 25, 2014, which is hereby incorporated by reference for all purposes as if fully set forth herein.

BACKGROUND

An embodiment of the present disclosure relates to a method of configuring a watch screen in a wearable electronic device and a wearable electronic device implementing the same.

With development of technologies, an electronic device can be manufactured in a form of glasses or a watch which can be worn by a user. Further, the electronic device can be manufactured not only in a modified form but also with the ability to perform various functions. The electronic device, which can be worn by a user, may be named a "wearable electronic device." The wearable electronic device can perform various functions, and an operation thereof may be controlled by a portable electronic device. When the portable electronic device controls the wearable electronic device, the portable device can be referred to as "a main electronic device", while the corresponding wearable electronic device can be referred to as a "sub-electronic device." The wearable electronic device can transmit/receive a signal to/from the portable electronic device (main electronic device), and perform a function corresponding to the received signal. Further, the portable electronic device can transmit a signal received from a server, to the wearable electronic device, to allow the wearable electronic device to receive the signal of the server.

Since a wearable electronic device is mostly used while being worn by a user, the size of a screen thereof may be limited. The wearable electronic device may have a screen which is generally smaller than that of a smartphone, and thus may display a limited amount of information. Since the information displayed on the wearable electronic device may be limited, a user may see less information on the wearable electronic device than on another electronic device, such as a smartphone. The foregoing may be inconvenient to the user.

The wearable electronic device can change and modify a configuration of a screen in a software scheme in order to display a larger amount of information through the limited size of the screen. Further, the wearable electronic device can be connected to the main electronic device and may generally receive a controlling signal from the main electronic device. In other words, the wearable electronic device does not change or modify information displayed on a display unit of the wearable electronic device or perform functions by itself. The portable electronic device assist the in the execution of an application and/or function by the wearable electronic device by transmitting information corresponding to the application and/or function to the wearable electronic device. Accordingly, since the user of the wearable electronic device can change and request functions, which can be performed by the wearable electronic device, under the control of the portable electronic device, the foregoing can be inconvenient to the user.

SUMMARY

Presented herein is a method of configuring a watch screen, the method comprising selecting one of a plurality of predetermined watch screens, thereby resulting in a selected watch screen; determining at least one icon of a plurality of predetermined icons as components of the selected watch screen; and displaying the selected watch screen, wherein the selected watch screen includes the at least one icon.

Additionally presented herein is a method of configuring a watch screen, the method comprising detecting an event by which a current mode is converted into a watch screen editing mode; selecting a watch screen to be edited in the watch screen editing mode, thereby resulting in a selected watch screen; and changing an icon included in the selected watch screen in accordance with an input.

Additionally presented herein is a wearable electronic device comprising a memory that stores a watch application and a predetermined icon on the basis of the watch application; a controller that selects one of a plurality of predetermined watch screens on the basis of the watch application stored in the memory, thereby resulting in a selected watch screen, determines at least one icon of a plurality of predetermined icons as components of the selected watch screen, and displays the watch screen including the at least one determined icon on a display unit; and the display unit configured to display the selected watch screen including the at least one determined icon.

Additionally presented herein is an electronic device comprising: a non-transitory computer readable medium storing a plurality of executable instructions; and at least one processor for executing the plurality of executable instructions, wherein execution of the plurality of the executable instructions causes the at least one processor to perform: selecting one of a plurality of predetermined watch screens, thereby resulting in a selected watch screen; determining at least one icon of a plurality of predetermined icons as components of the selected watch screen; and displaying the selected watch screen, wherein the selected watch screen includes the at least one icon.

In a method of configuring a watch screen and a wearable electronic device implementing the same according to various embodiments of the present disclosure, the watch screen may be configured to efficiently provide various pieces of information through a limited small screen. The wearable electronic device displays various pieces of information provided by an application in a form of an icon, and allows a user to easily identify the information. The wearable electronic device can configure various watch screens, and a user can select the watch screens according to a taste thereof. Further, the wearable electronic device can change a configuration of the watch screen independently from the wearable electronic device by a user's input. Thus, a user can voluntarily add a necessary application, and conveniently change the configuration of the watch screen of the wearable electronic device.

BRIEF DESCRIPTION OF THE DRAWINGS

The above features and advantages of the present embodiments of the present disclosure will be more apparent from the following detailed description in conjunction with the accompanying drawings, in which.

DETAILED DESCRIPTION

Figure 1:
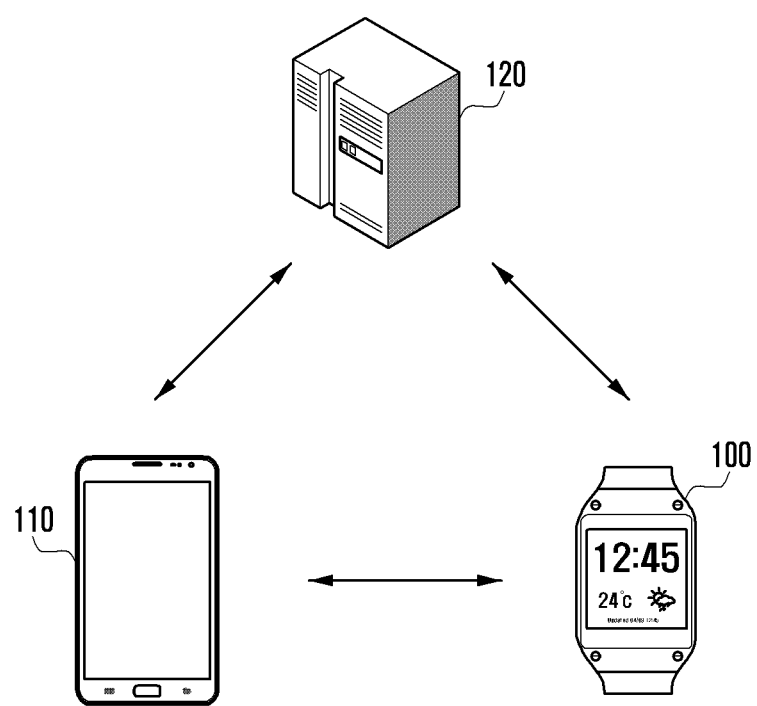
FIG. 1 is a schematic view illustrating communication among a main electronic device, a server, and a wearable electronic device according to various embodiments of the present disclosure.

Hereinafter, various embodiments of the present disclosure will be described with reference to the accompanying drawings. The present disclosure may have various modifications and embodiments and thus will be described in detail with reference to specific embodiments illustrated in the drawings. However, it should be understood that there is no intent to limit the present disclosure to the particular forms disclosed herein; rather, the present disclosure should be construed to cover all modifications, equivalents, and/or alternatives falling within the spirit and scope of the disclosure. In describing the drawings, similar reference numerals are used to designate similar elements.

The suffixes "module" and "unit" as used for elements in various embodiments of the present disclosure are assigned only for ease of description, and do not have distinguishing meanings or roles as such. Therefore, it should be noted that the suffixes "module" and "unit" may also be interchangeably used.

The term "include" or "may include" refers to the existence of a corresponding disclosed function, operation or component which can be used in various embodiments of the present disclosure and does not limit one or more additional functions, operations, or components. In the present disclosure, the terms such as "include" or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof The term "or" as used in various embodiments includes any or all of combinations of listed words. For example, the expression "A or B" may include A, may include B, or may include both A and B.

The expression "1", "2", "first", or "second" used in various embodiments of the present disclosure may modify various components of various embodiments but does not limit the corresponding components. For example, the above expressions do not limit the sequence and/or importance of the elements. The above expressions are used merely for the purpose of distinguishing an element from the other elements. For example, a first user device and a second user device indicate different user devices although both of them are user devices. For example, without departing from the scope of the present disclosure, a first component element may be named a second component element. Similarly, the second component element also may be named the first component element.

The expression "main electronic device" used in various embodiments may imply an electronic device connected to a wearable electronic device to control an operation of the wearable electronic device. The wearable electronic device can share information with the "main electronic device" and can be controlled by the "main electronic device".

The expression "watch screen" used in various embodiments may imply a screen for displaying watch information and various pieces of information through a display unit of the wearable electronic device. The "watch screen", which is a screen predetermined by a watch application, may be configured in various forms. The "watch screen" may be configured to simultaneously display the watch information and various pieces of information.

The expression "icon" used in various embodiments may imply an alarm window configured by an image including various pieces of information, and text information. For example, a "weather icon" may be an icon including information (e.g. temperature, humidity, state) on weather. The "icon" may include a "notification icon", a "weather icon", a "health icon", a "dual watch icon", and a "battery icon" in order to identify various pieces of information, and a new icon may be generated on the basis of an application installed in an electronic device. Further, the "icon" may imply a widget for expressing various pieces of information or executing a function.

As used herein, terms are used merely for describing specific embodiments and are not intended to limit the present disclosure. As used herein, the singular forms are intended to include the plural forms as well, unless the context clearly indicates otherwise.

Unless defined differently, all terms used herein, which include technical terminologies or scientific terminologies, have the same meaning as a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present disclosure.

For example, the electronic device may include at least one of a smart phone, a tablet Personal Computer (PC), a mobile phone, a video phone, an e-book reader, a desktop PC, a laptop PC, a netbook computer, a PDA, a Portable Multimedia Player (PMP), an MP3 player, a mobile medical device, a camera, a wearable device (for example, a Head- Mounted-Device (HMD) such as electronic glasses, electronic clothes, an electronic bracelet, an electronic necklace, an electronic appcessory, an electronic tattoo, and a smart watch.

Hereinafter, an electronic device according to various embodiments of the present disclosure will be described with reference to the accompanying drawings. In various embodiments, the term "user" may indicate a person using an electronic device or a device (e.g. an artificial intelligence electronic device) using an electronic device.

FIG. 1 is a schematic view illustrating communication among a main electronic device, a server, and a wearable electronic device according to various embodiments of the present disclosure.

Referring to FIG. 1, a wearable electronic device 100 is communicably linked to a portable electronic device 110 and can transmit/receive a signal to/from the portable electronic device 110. The portable electronic device 110 can share data with the wearable electronic device 100 and control an operation of the wearable electronic device 100. When the portable electronic device 110 is a main electronic device, the wearable electronic device 100 corresponds to a sub-electronic device, the portable electronic device 110 can control an operation of the wearable electronic device 100. The portable electronic device 110 may change settings of the wearable electronic device 100. Further, the portable electronic device 110 can perform wireless communication with a server 120 on the basis of an embedded Subscriber Identification Module (SIM) card. The portable electronic device 110 can transmit/receive a signal to/from the server 120, and can transmit information received from the server 120, to the wearable electronic device 100. That is, the wearable electronic device 100 can receive information stored in the server, through the portable electronic device. However, the wearable electronic device according to various embodiments of the present disclosure may have a SIM card autonomously embedded therein and can be communicably linked directly to the server 120 on the basis of the SIM card. For example, when the wearable electronic device 100 is located at a distance at which the wearable electronic device 100 can be communicably linked to the portable electronic device 110, the wearable electronic device 100 can receive information stored in the server 120, through the portable electronic device 110. However, when the wearable electronic device 100 is located at a location at which the wearable electronic device 100 cannot be communicably linked to the portable electronic device 110 or is in a state in which the wearable electronic device 100 cannot be communicably linked to the portable electronic device 110 (e.g. a state in which a battery of the portable electronic device 110 is discharged), the wearable electronic device 100 can be communicably linked directly connected to the server 120 through the embedded SIM card. The wearable electronic device 100 communicably linked to the portable electronic device 110 or the server according to a communication environment, so that a battery thereof can be used more efficiently. The wearable electronic device 100 can consistently save electric power of the battery thereof consumed for connection with the portable electronic device 110 in a state in which the wearable electronic device 100 cannot be connected to the portable electronic device 110. Thus, the wearable electronic device according to the present disclosure can more efficiently use the battery.

Further, the wearable electronic device 100 can receive a phone number different from that of the portable electronic device 110 and autonomously perform communication with the server 120, on the basis of the embedded SIM card. The wearable electronic device 100 according to various embodiments of the present disclosure performs a communication function through the portable electronic device 110 when the wearable electronic device 100 can be communicably linked to the portable electronic device 110, and directly performs a communication function through the server 120 when the wearable electronic device 100 cannot be communicably linked to the portable electronic device 110, so as to more efficiently use the battery.

In certain embodiments, the wearable electronic device 100 can display one of one of a plurality of watch screens. Within the watch screens, the wearable electronic device 100 can display at least one icon as a component of the watch screen. The icon(s) can include information from another electronic device, such as the portable electronic device 110, information originating from the server 120 and provided by the portable electronic device, or information originating from the server 120 and provided directed from the server 120 to the wearable electronic device.

Figure 2:
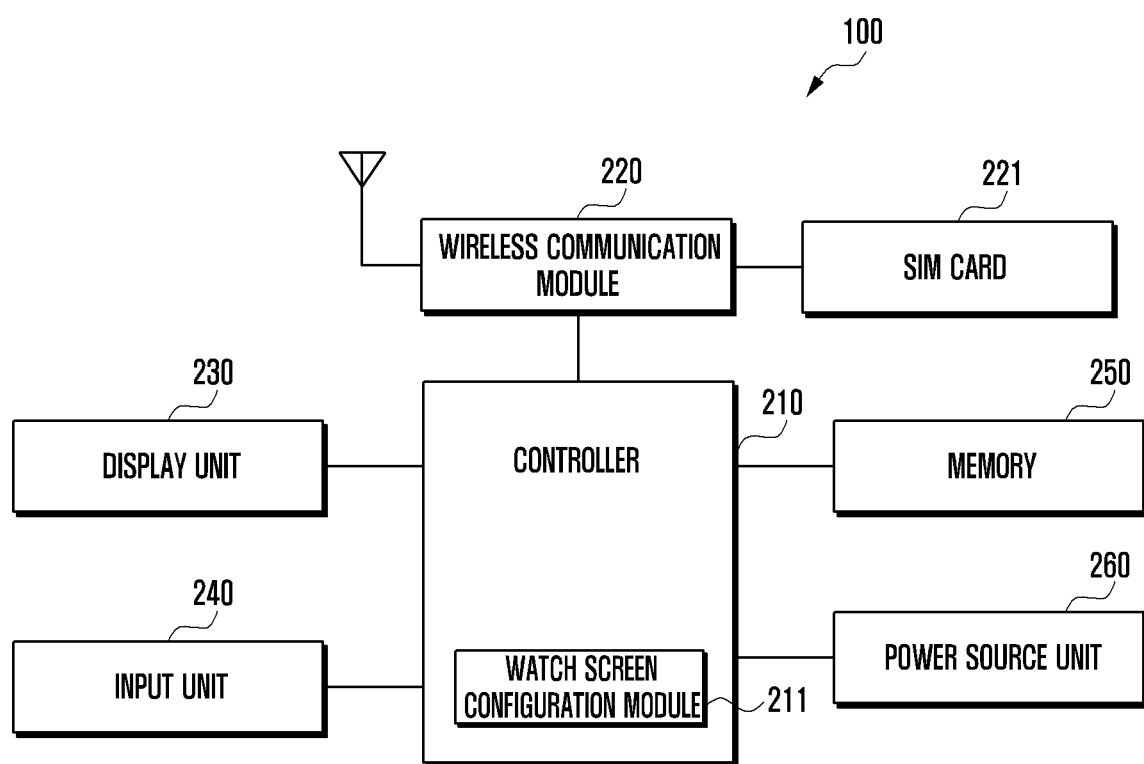
FIG. 2 is a block diagram of a wearable electronic device according to various embodiments of the present disclosure.

FIG. 2 is a block diagram of a wearable electronic device according to various embodiments of the present disclosure.

Referring to FIG. 2, the wearable electronic device 100 may include a controller 210, a wireless communication unit 220, a display unit 230, an input unit 240, a memory 250, and a power source unit 260.

The above-mentioned components can be connected to each other by a bus (not shown), and the controller 210 can transmit a signal (e.g. a control message) to the components (e.g. the wireless communication unit 220, the display unit 230, the input unit 240, the memory 250, and the power source unit 260) to control the components.

The controller 210 can generally control an overall operation of the wearable electronic device 100. For example, the controller 210 can receive a command from the above-mentioned other components (e.g. the wireless communication unit 220, the display unit 230, the input unit 240, the memory 250, and the power source unit 260) to decode the received command so as to perform calculation or data processing according to the decoded command. The controller 210 may include a watch screen configuration module 211.

The watch screen configuration module 211 can configure a watch screen output through the display unit 230 of the wearable electronic device 100. For example, the watch screen configuration module 211 can configure a watch displayed on the watch screen using an analog watch image or a digital watch image. Further, the watch screen configuration module 211 can determine a type and a location of an icon provided on the watch screen together with the watch. The watch screen configuration module 211 can arrange each of icons on the basis of a shape of a watch screen, which is predetermined by a developer. Further, the watch screen configuration module 211 can automatically arrange an icon associated with a specific icon according to a priority when the specific icon is arranged. For example, when the "health icon" is arranged, the watch screen configuration module 211 can automatically display an icon corresponding to heart rate information associated with the "health icon" at a top priority. Here, the "health icon" may be an icon corresponding to an application for measuring the number of steps which is one of pieces of exercise information for a user. Further, the watch screen configuration module 211 can configure the "weather icon" for determining whether the "health icon" can be consistently performed, to a second priority. An icon associated with a specific icon and a priority of icons may be determined by a developer or user's setting.

Further, when a new application associated with a watch application is installed in a portable electronic device (the portable electronic device 110 in FIG. 1) communicably linked to the wearable electronic device 100, the watch screen configuration module 211 can compare meta data information of the new application with an information category stored in the memory 250. Further, the watch screen configuration module 211 can automatically configure a category of a new application and can display an icon on the basis of the configured category. For example, when the new application is an application relating to "weather", the watch screen configuration module 211 can compare the meta data information with a "weather category" stored in the memory 250. Further, the watch screen configuration module 211 can configure a category of the new application as the "weather" category. Further, the watch screen configuration module 211 can make a configuration to preferentially display icons configured as the "weather" category when an icon corresponding to the new application is included in the watch screen. The watch screen configuration module 211 can configure a sequence in which icons are displayed according to setting of a developer and a user.

The wireless communication unit 220 may include one or more components which enable wireless communication between the wearable electronic device 100 and the portable electronic device 110 or wireless communication between the wearable electronic device 100 and a server (the server 120 in FIG. 1). The wireless communication unit 220 may be communicably linked to the portable electronic device and can perform wireless communication with the portable electronic device. Further, the wireless communication unit 220 can directly perform wireless communication with the server through a SIM card 221. The SIM card 221 may be inserted into a slot of the wearable electronic device and may be used for wireless communication through the wireless communication unit 220. The SIM card 221 embedded in the wearable electronic device 100 may be different from a SIM card embedded in the main electronic device, and may provide a phone number different from that of the portable electronic device to the wearable electronic device 100. That is, when the wearable electronic device 100 cannot be communicably linked to the portable electronic device, the wireless communication unit 220 can receive information from the server while being communiably linked directly to the server. The wireless communication unit 220 can be selectively communicably linked to the portable electronic device or the server under the control of the controller 210, so that a battery included in the power source unit 260 can be efficiently used.

Although not illustrated, the wireless communication unit 220 may include a broadcast reception module, a mobile communication module, a wireless Internet module, a short-range communication module, a location information module, etc. The wireless communication unit 220 can perform wireless communication among the wearable electronic device, the portable electronic device, and the server through the above-mentioned modules.

The broadcast reception module from among the modules included in the wireless communication unit 220 can receive a broadcast signal through an antenna or receive broadcast related information from an external broadcast management server through a separate broadcast channel. Here, the broadcast channel may include a satellite channel and a ground wave channel. Further, the broadcast management server may be a server for generating and transmitting the broadcast signal and the broadcast related information or a server for receiving a previously-generated broadcast signal and broadcast related information to transmit the received broadcast signal and broadcast related information to a terminal. Here, the broadcast signal may include a broadcast signal in which a data broadcast signal is combined to a TV broadcast signal or a radio broadcast signal as well as a data broadcast signal such as a TV broadcast signal, a radio broadcast signal, and traffic information. Further, the broadcast related information may include information related to a broadcast channel, a broadcast program, and a broadcast service provider, and can be received using various digital broadcast systems such as an Electronic Program Guide (EPG) or a Digital Video Broadcast-Terrestrial (DVB-T) of a Digital Multimedia Broadcasting (DMB), a DMB-Satellite (DMB-S), a Media Forward Link Only (MediaFLO), a Digital Video Broadcast-Handheld (DVB-H), an Integrated Service Digital Broadcast-Terrestrial (ISDB-T), etc.

The mobile communication module from among the modules included in the wireless communication unit 220 can transmit/receive a wireless signal to/from at least one of an eNB, an external terminal, and a server on a wireless communication network. Here, the wireless signal may include data having various forms according to transmission/reception of a voice call signal, a video call signal, or an SMS/multimedia message.

Further, the wireless Internet module corresponds to a configuration for wireless Internet access, and may be embedded in the wearable electronic device or installed in the exterior of the wearable electronic device 100. The wireless Internet module can enable the wearable electronic device 100 to be connected to the server by itself. The controller 210 is connected to the server to enable the wearable electronic device to use wireless Internet. For example, examples of wireless Internet technologies may include Wireless Local Area Network (WLAN) (Wi-Fi), Wireless broadband (Wibro), World Interoperability for Microwave Access (Wimax), High Speed Downlink Packet Access (HSDPA) and the like.

The short-range communication module can perform short-range communication, and Bluetooth, Radio Frequency IDentification (RFID), Infrared Data Association (IrDA), Ultra WideBand (UWB), ZigBee, etc. may be employed as the short-range communication.

Further, the location information module corresponds to a configuration for acquiring location information of the wearable electronic device 100, and a Global Positioning System (GPS) module may be employed as the location information module.

The display unit 230 can display various kinds of information (e.g. an icon corresponding to an application) stored in the memory 250. The display unit 230 may include, for example, a panel, a hologram apparatus, and a projector. Further, the display unit 230 may further include a control circuit for controlling the panel, the hologram apparatus, and the projector. The display unit 230 may include at least one of a Liquid Crystal Display (LCD), a Thin Film Transistor-Liquid Crystal Display (TFT-LCD), an Organic Light-Emitting Diode (OLED), a flexible display, and a 3D display. Although not illustrated, the display unit 230 may include a touch panel which can recognize a touch input of a user. The display unit 230 may be configured by a touch screen, and may be used as an input device through a touch panel in addition to an output apparatus. The touch panel can recognize a touch input by at least one of a capacitive scheme, a resistive scheme, an infrared scheme, and an ultrasonic scheme. Further, the touch pad may further include a control circuit. In a case of the capacitive scheme, physical contact or proximity recognition is possible. The touch panel may further include a tactile layer. In this case, the touch panel may provide a user with a tactile reaction. In certain embodiments, the display unit 130 can display a watch screen that includes either an analog or digital watch and includes one or more icons as components.

The input unit 240 may include a physical input button and the touch panel included in the display unit 230. The input unit 240 can receive a user's input to transmit information on the user's input to the controller 210. The input unit 240 can recognize a user's input as a toggle input when receiving the user's input through the touch panel included in the display unit 120. Here, the user's input may include a touch gesture such as a touch, a flick, a swipe, etc.

The memory 250 can store a command or data which is received from the controller or other components (e.g. the wireless communication unit 220, the display unit 230, the input unit 240, and the power source unit 260) or generated by the controller 210 or the other components. Although not illustrated, the memory 250 may include an internal memory or an external memory. The internal memory may include, for example, at least one of a volatile memory (e.g., a Dynamic RAM (DRAM), a Static RAM (SRAM), and a Synchronous Dynamic RAM (SDRAM)), and a non-volatile Memory (e.g., a One Time Programmable ROM (OT-PROM), a Programmable ROM (PROM), an Erasable and Programmable ROM (EPROM), an Electrically Erasable and Programmable ROM (EEPROM), a mask ROM, a flash ROM, a NAND flash memory, and an NOR flash memory). The internal memory may be a Solid State Drive (SSD). The external memory may further include a flash drive, for example, a Compact Flash (CF), a Secure Digital (SD), a Micro Secure Digital (Micro-SD), an extreme Digital (xD), or a memory stick.

The power source unit 260 may include, for example, a Power Management Integrated Circuit (PMIC), a charger Integrated Circuit (IC), or a battery or fuel gauge. Further, the power source unit can supply electric power to the wearable electronic device 100.

Figure 3:
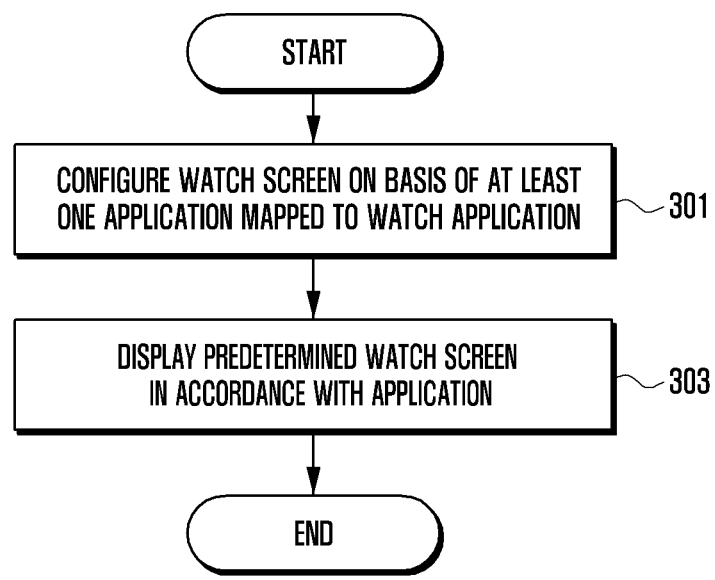
FIG. 3 is a flowchart illustrating a method of configuring a watch screen according to various embodiments of the present disclosure.

FIG. 3 is a flowchart illustrating a method of configuring a screen of a watch according to various embodiments of the present disclosure.

Referring to FIG. 3, in operation 301, the controller 210 can configure a watch screen on the basis of at least one application mapped to a watch application. Here, the watch application may be a specific application configuring the watch screen output through the display unit 230 of the wearable electronic device 100. The watch application may display a watch on the watch screen, and display a watch having an analog form or a watch having a digital form. The controller 210 can variously configure the watch screen using at least one application of applications mapped to the watch application. Here, the various configurations of the watch screen using the at least one application may imply that the watch screen is variously configured using an icon generated in accordance with an application. In the configuration of the watch screen, the whole shape and a location of the icon may be predetermined or configured by a developer in advance. Further, a priority of an application automatically added and displayed when a specific application is selected may be predetermined or determined by a developer in advance. For example, the controller 210 can determine an icon to be included in the watch screen, and can additionally include another icon in the watch screen on the basis of an icon category of the icon.

When one icon is the "health icon", the controller 210 can additionally include the "weather icon" in the watch screen with relation to health on the basis of a health category or an icon for measuring and displaying a heart rate of a user. Since the importance of each icon may be different among different users, the controller 201 can change a priority of icons to be preferentially added on the basis of user's setting. For example, the controller 210 can change a priority predetermined by a developer on the basis of the user's setting.

Further, in operation 303, the controller 210 can display a predetermined watch screen in response to the application. For example, the controller 210 can include an icon generated in response to the application in the watch screen and display the watch screen. Although not illustrated, the controller 210 can convert an icon displayed on the watch screen when a user's input is generated on the icon displayed on the watch screen. For example, the icon displayed on the watch screen can correspond to a toggle key, and may be changed to another icon according to a user's input. The icon can be changed in an order from a top priority on the basis of a predetermined priority.

Figure 7A:
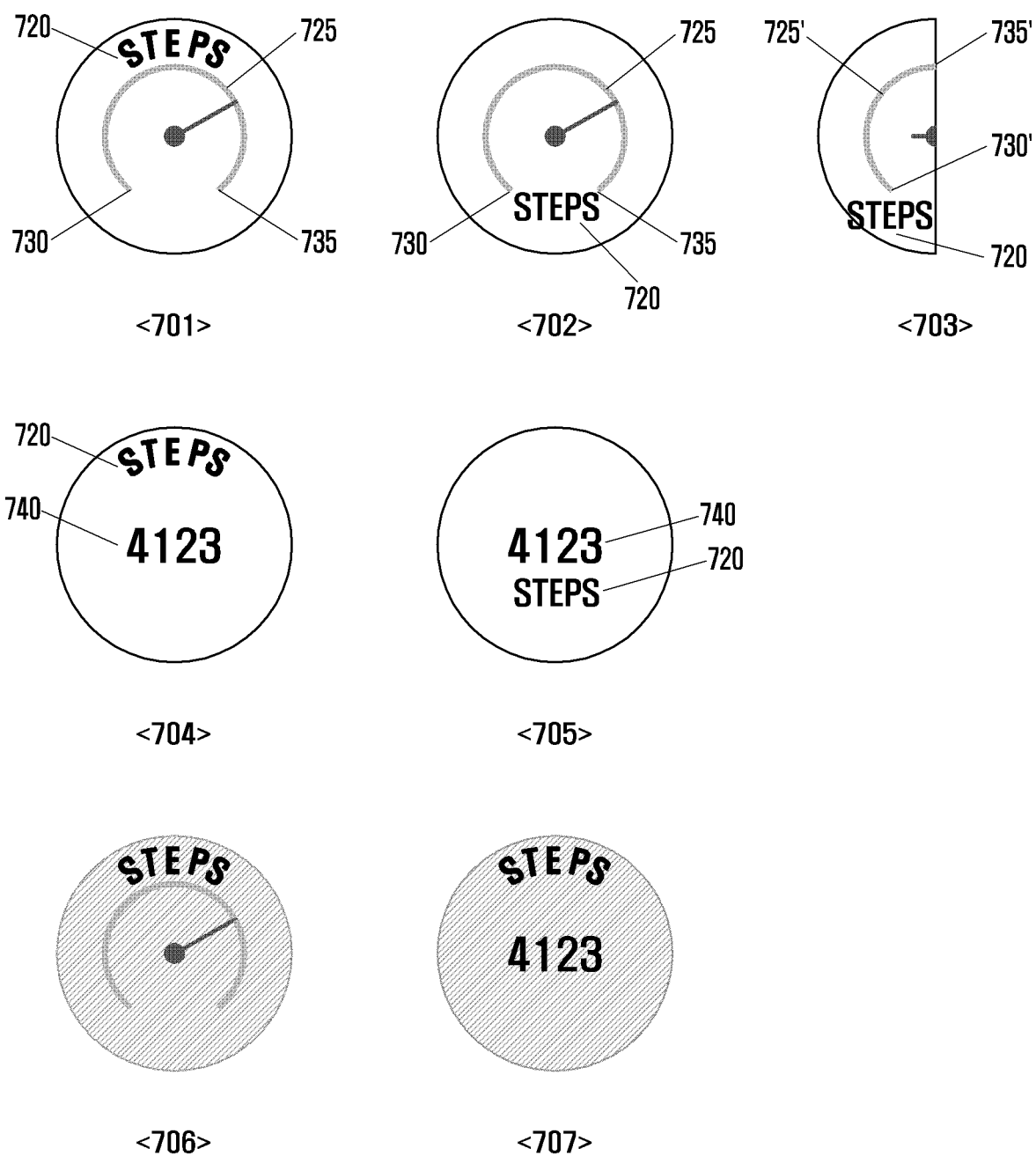
FIGS. 7A and 7B illustrate displaying heath information on the basis of a watch screen according to various embodiments of the present disclosure.
Figure 7B:
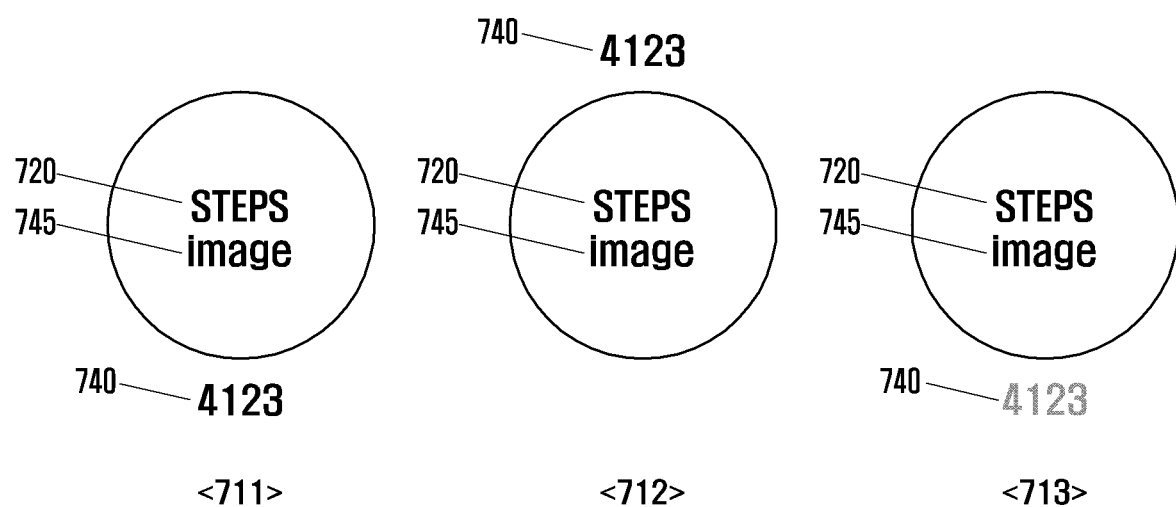
Figure 8A:
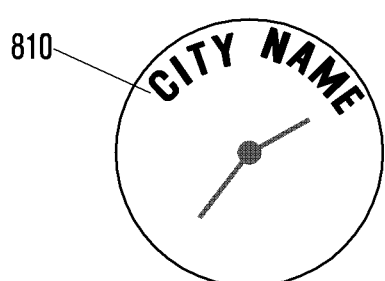
FIG. 8A and FIG. 8B illustrate displaying dual watch information on the basis of a watch screen according to various embodiments of the present disclosure.
Figure 8A:
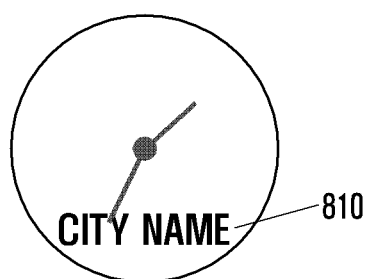
Figure 8A:
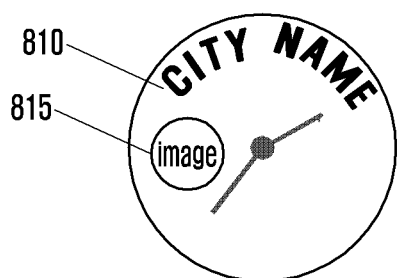
Figure 8A:
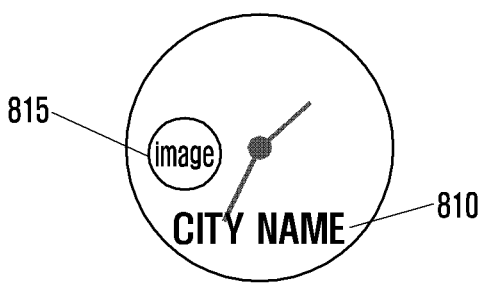
Figure 8A:
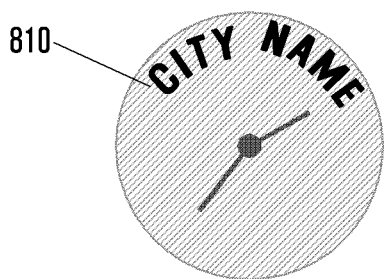
Figure 8A:
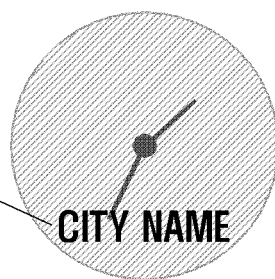
Figure 8A:
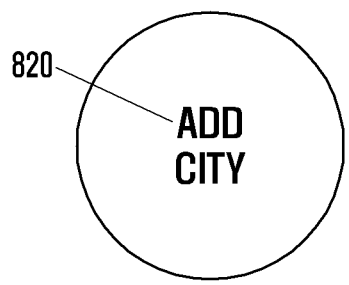
Figure 8B:
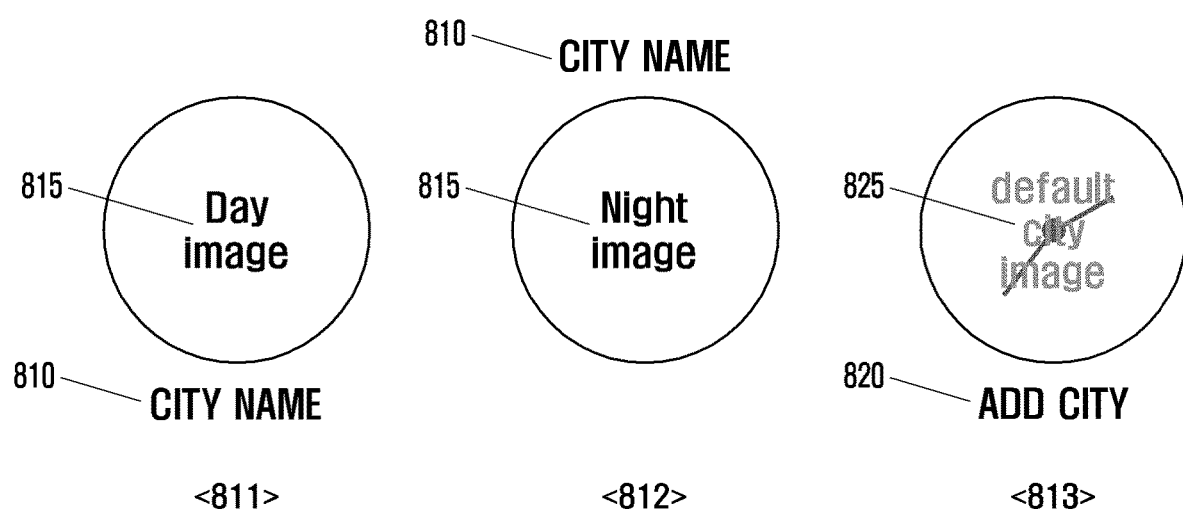
Figure 9A:
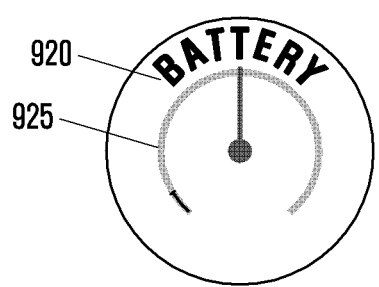
FIG. 9A and FIG. 9B illustrate displaying battery information on the basis of a watch screen according to various embodiments of the present disclosure.
Figure 9A:
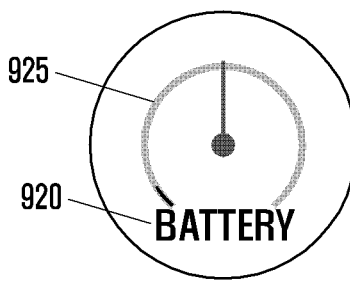
Figure 9A:
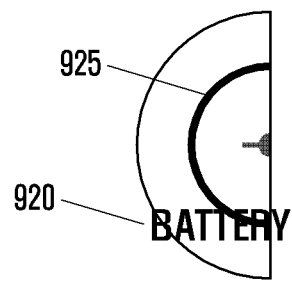
Figure 9A:
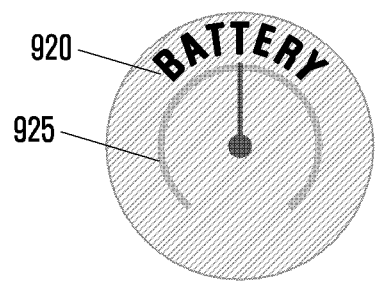
Figure 9B:
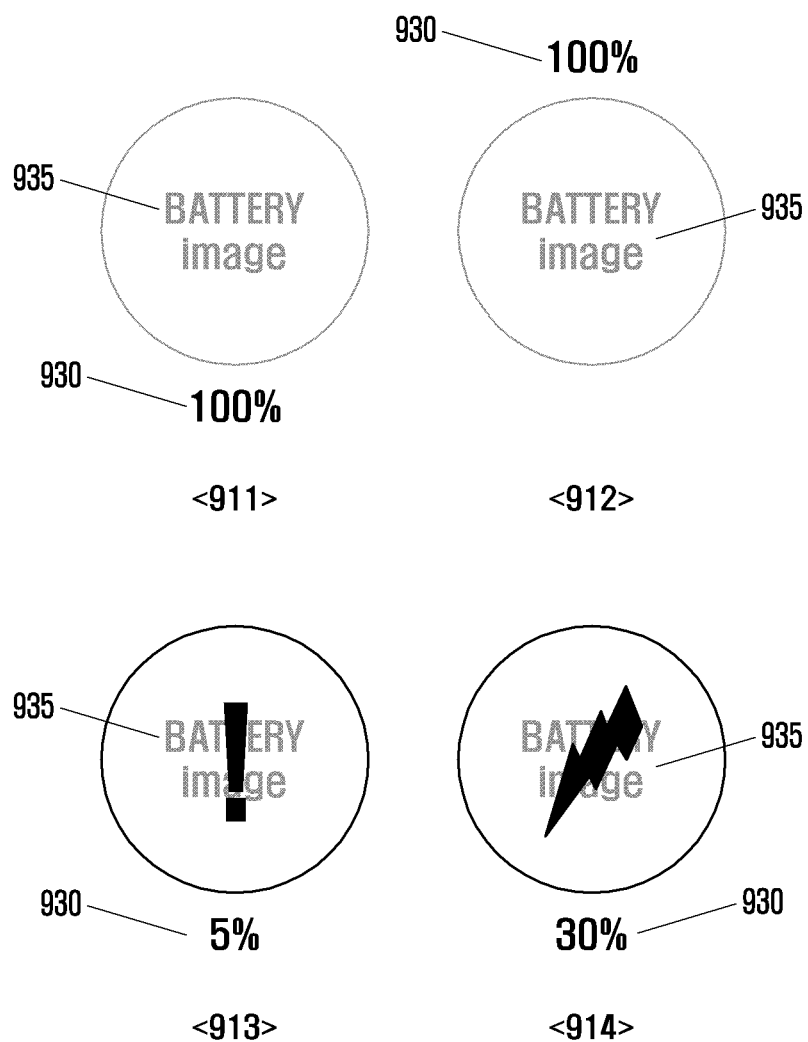

Various watch screens displayable on the display device will now be described in FIGS. 4A and 4B. The watch screens can include different categories of icons. FIGS. 5A and 5B describe notification icons. FIGS. 6A to 6D describe weather icons. FIGS. 7A and 7B describe health icons. FIGS. 8A and 8B include dual watch icons. FIGS. 9A and 9B describe battery icons.

Figure 4A:
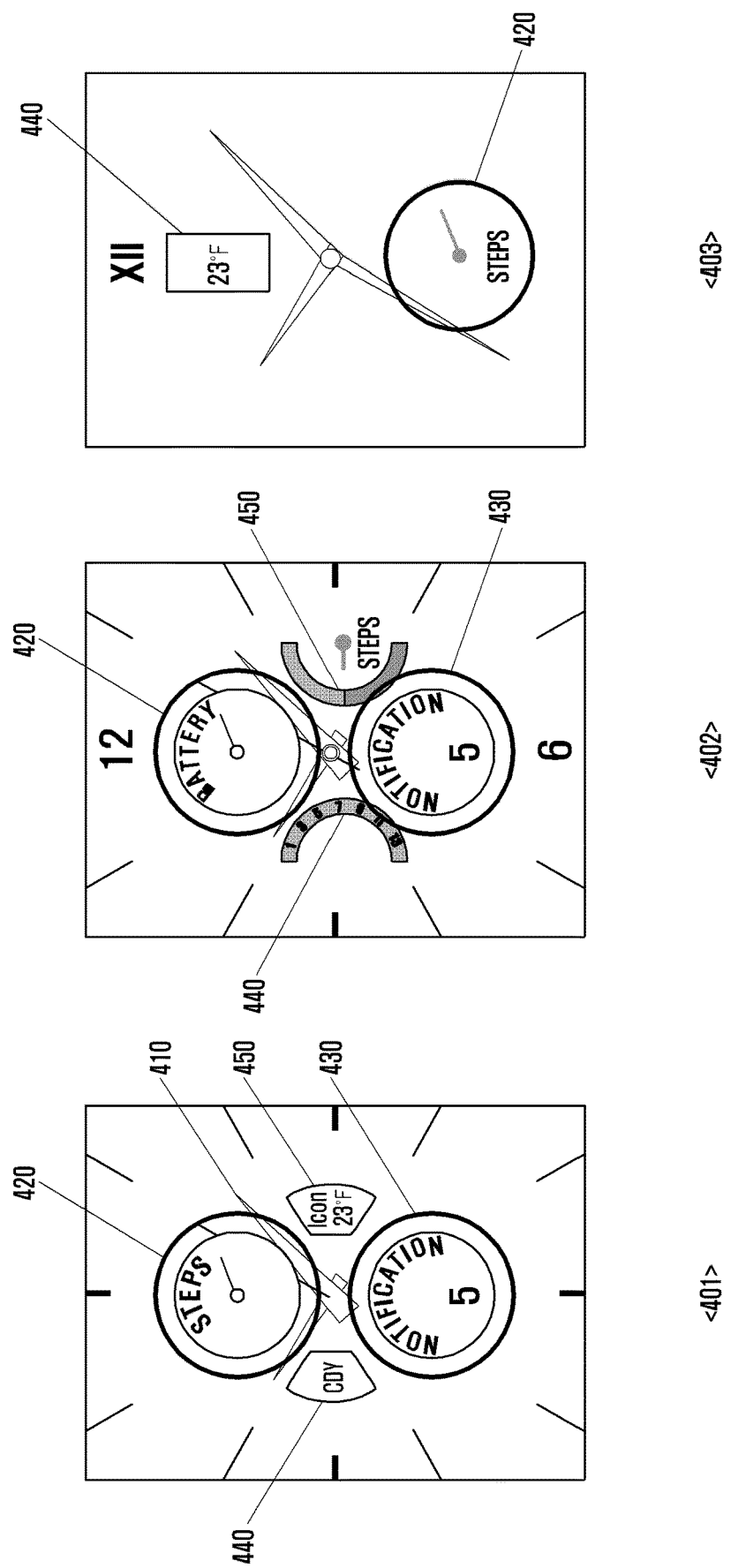
FIG. 4A and FIG. 4B illustrate various watch screens according to various embodiments of the present disclosure.
Figure 4B:
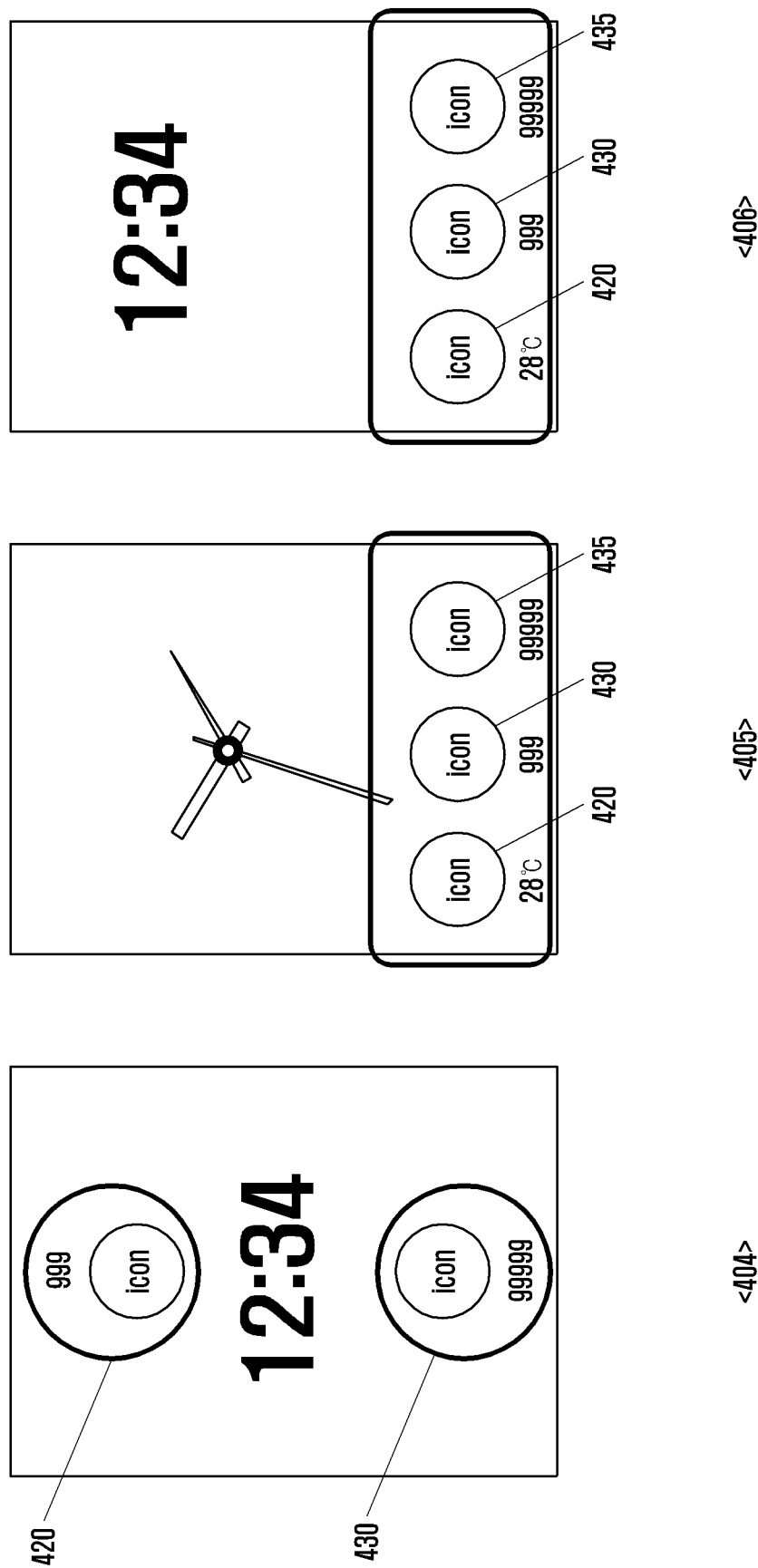
Figure 5A:
FIG. 5A and FIG. 5B illustrate displaying alarm information on the basis of a watch screen according to various embodiments of the present disclosure.
Figure 5A:
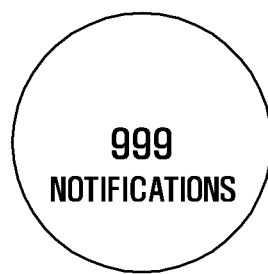
Figure 5A:
Figure 5A:
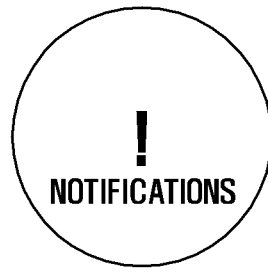
Figure 5B:
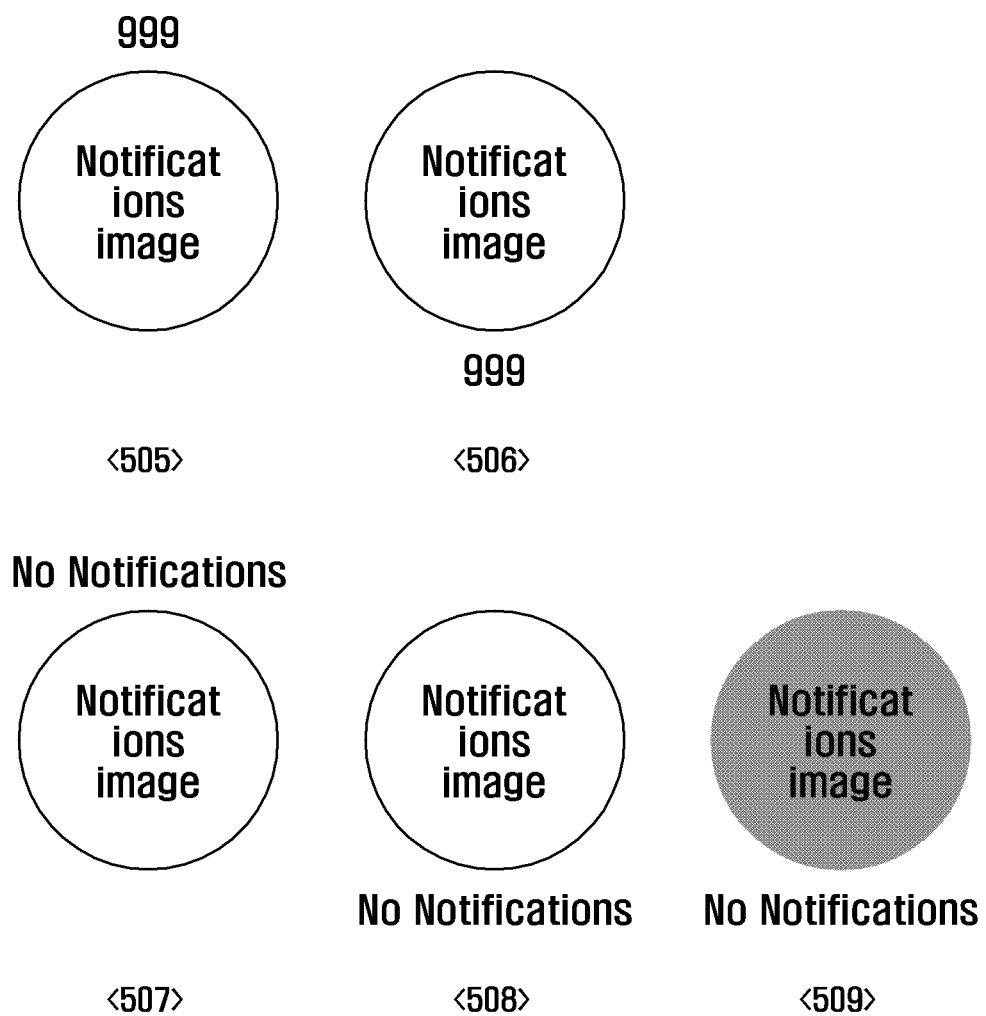

FIGS. 4A and 4B illustrate various examples of watch screens according to various embodiments of the present disclosure.

Referring to FIG. 4A, there are block diagrams of various watch screens 401, 402, and 403. Watch screen 401 may be displayed on the display unit 230 of the wearable electronic device 100 The controller 210 of the wearable electronic device 100 can display a watch 410 corresponding to a watch application together with variable icons 420 and 430 corresponding to an application mapped to the watch application. That is, the controller 210 of the wearable electronic device 100 can display the watch 410 included in the watch screen together with the variable icons 420 and 430 predetermined by a developer and a user on the display unit 230. Here, the icons predetermined by a developer and a user are classified into a first icon 420 and a second icon 430.

In watch screen 401, the controller 210 can change the first icon 420 and the second icon 430 according to a setting. For example, when a watch screen of picture 401 is displayed according to a setting of a developer and a user, the controller 210 can display the first icon 420 as a "health icon" and the second icon 430 as a "notification icon". The controller 210 can configure the first icon 420 and the second icon 430 individually or configure the first icon 420 and the second icon 430 as icons associated with each other. For example, when the first icon 420 corresponds to a "health icon", the controller 210 can display the second icon 430 as an icon in which the heart rates associated with the "health icon" is displayed. The controller 210 can configure the second icon 430 by mapping the second icon 430 to an icon corresponding to the first icon 420. At this time, the second icon 430 mapped to the first icon 420 may be at least one icon. When the number of the second icons 430 mapped to the first icon is two or more, the controller 210 can make a configuration to firstly display an icon having a high priority by configuring a priority between icons disposed in the second icons 430. Further, the controller 210 can make a configuration to change icons having the next highest priorities other than an icon having the highest priority in accordance with a user's touch input. Here, the user's input may include a touch gesture such as a touch, a flick, a swipe, etc. The controller 210 can configure the second icon 430 in accordance with the first icon 420 when the first icon 420 is configured, but the present disclosure is not limited thereto. Further, in watch screen 401, the controller 210 can also display fixed icons 440 and 450, which cannot be changed according to a user's touch input, other than the first icon 420 and the second icon 430 which can be changed according to a user's touch input. Here, the fixed icons 440 and 450 can be classified into a third icon 440 and a fourth icon 450 for the convenience. In picture 401, the controller 210 can make a configuration such that weather (for example, "CDY" representing cloudy conditions) is displayed in the third icon 440 and temperature (23 F) is displayed in the fourth icon 450. The controller 210 can change the third icon 440 and the fourth icon 450 on the basis of setting of a developer and a user. The controller 210 can configure the third icon 440 and the fourth icon 450 by mapping the icons to be associated with each other or configure the third icon 440 and the fourth icon 450 individually.

Further, when a specific application associated with the watch application is installed in the portable electronic device (the portable electronic device 110 in FIG. 1) connected to the wearable electronic device 100, the controller 210 can make a configuration to display an icon generated through the specific application on the wearable electronic device 100. For example, when a Facebook application is installed in the portable electronic device, the controller 210 can include a Facebook icon generated through the Facebook application in the "notification icon," e.g., 430, in accordance with an icon category. Further, when the "notification icon" is configured, the controller 201 can provide the Facebook icon together with predetermined "notification icons" and configure the corresponding icons according to a user. That is, when a new application associated with the watch application is installed in the portable electronic device connected to the wearable electronic device 100, the controller 210 can automatically include an icon generated on the basis of the new application in a predetermined icon category in accordance with the corresponding icon category.

Watch screen 402 may be a watch screen different from that of watch screen 401 from among various examples of watch screens. In watch screen 402, the controller 210 can display a variable icons 420, 430 and fixed icons 440, 450. The controller 210 can configure icons individually such that the variable icon in picture 402 is identical to the variable icon in picture 401 or can make a configuration to automatically select one variable icon when another variable icon is selected. In watch screen 402, variable icon 420 can be a battery gauge, while variable icon 430 can be a "notification" icon.

Watch screen 403 to 406 may be yet other watch screens from among various watch screens. In picture 403, the controller 210 of the wearable electronic device 100 can display one variable icon 420 and one fixed icon 440. In picture 403, the controller 210 can display the one variable icon 420, a "notification icon", and the one fixed icon 440, such as an icon that displays the temperatures, to provide less but more important information to a user.

In watch screen 404, the controller 210 can display a watch and two variable icons 420, 430. The watch may be configured in an analog scheme or a digital scheme. Further, the two variable icons 420, 430 can be configured individually or can be configured by mapping icons associated with each other, which is similar to the above-described contents. The variable icons 420, 430 in watch screen 404 may be an arbitrarily illustrated example.

In watch screens 405 and 406, the controller 210 can display a watch and three variable icons 420, 430, and 435. Watch screens 405 and 406 may be different from each other in that a watch of watch screen 405 is an analog type and a watch of watch screen 406 is a digital type. The three variable icons 420, 430, and 435 displayed in picture 405 and picture 406 may be configured individually or may be configured by mapping them to each other.

FIGS. 5A and 5B illustrate various examples for displaying alarm information on the basis of a watch screen according to various embodiments of the present disclosure.

Referring to FIG. 5A, there are illustrated block diagrams of various "notification icons" 501 . . . 504. Here, although the wording "NOTIFICATIONS" is displayed in order to identify that the corresponding icon is a "notification icon", the present disclosure is not limited thereto. Icons 501 and 502 may include a text and a number. The icon 501 has a circular shape and includes the wording "NOTIFICATIONS" displayed at an uppermost end of the interior of a circle and the number of unidentified pieces of notification information displayed at the center of the circle using a number, e.g., "999."

Further, the icon 502 is similar to the icon of picture 501, but the wording "NOTIFICATIONS" is displayed below the number of unacknowledged notifications, which is displayed using a number, e.g., "999." The controller 210 can receive the notification information in real-time to update the number of unacknowledged notifications. Although not illustrated, the controller 210 can display the number of unacknowledged notifications by changing a color of the "notification icon". For example, the controller 210 can display the number of new notifications unacknowledged within the last hour with reference to a current time, using a red number. As a color of the "notification icon" is distinguishably displayed, a user can more efficiently acknowledge the notification information. Further, when there are no unacknowledged notifications, the controller 210 can display the number of unacknowledged pieces of notification information as "0".

Icons 504 may displayed in a state in which notification information cannot be received. For example, a state in which notification information cannot be received may correspond to a state in which the wearable electronic device 100 is far away from the main electronic device (the portable electronic device 110 in FIG. 1) or the main electronic device is powered off. Otherwise, the state may correspond to a state in which a communication environment deteriorates so that the main electronic device cannot communicate with the server (the server 120 in FIG. 1). In an icon of picture 503, the mark "!" is displayed at a part where the number of unidentified pieces of notification information is displayed using a number in picture 501. Further, in an icon of picture 504, the mark "!" is displayed at a part where the number of unacknowledged notifications are displayed using a number in picture 502.

Referring to FIG. 5B, there are illustrated block diagrams of various types of "notification icons" 505 to 509 displaying notification information. In the "notification icon" illustrated in FIG. 5B, a "Notifications image" by which it can be identified that there is at least one piece of notification information and the number of unacknowledged notifications ("999") are distinguishably displayed. The icons 505 and 506 illustrate a "Notification image" having a circular shape and the number "999" of unacknowledged notifications together while the number "999" of unacknowledged notifications is disposed outside the "Notifications image". The icon 505 illustrates the number of unacknowledged notifications, at an upper end of the "notification image" using a number, e.g., "999," and the icon of picture 506 illustrates the number of unacknowledged notifications at a lower end of the "notification image" using a number, e.g., "999." Here, the "notification image", which is an image by which it can be identified that there is at least one piece of notification information, can be changed according to setting of a developer and a user.

Although not illustrated, the controller 210 may display the "notification icon" by changing the "notification image" or a color of the number of unidentified pieces of notification information. For example, when there is new notification information unidentified within the last one hour with reference to a current time, the controller 210 can change the "notification image" or a color of the number of pieces of notification information. A user can more efficiently identify notification information through the changed "notification icon". Further, when there is no unidentified notification information, the controller 210 can display the number of unacknowledged notifications as "0".

Icons 507, 508 may be icons displayed in a state in which notification information cannot be received. The state in which notification information cannot be received is mentioned above, "No Notifications," with the description of icons 505 and 506. In icons 507 and 508, when notification information cannot be received, the controller 210 can display the wording "No Notification" at a part where the number of unacknowledged notifications are displayed. Here, when notification information cannot be received, the controller 210 illustrates the wording "No Notification", but the present disclosure is not limited thereto. In icon 509, when notification information cannot be received, the controller 210 can change and display a "notification image".

FIGS. 6A to 6D illustrate various examples for displaying weather information on the basis of a watch screen according to various embodiments of the present disclosure.

Figure 6A:
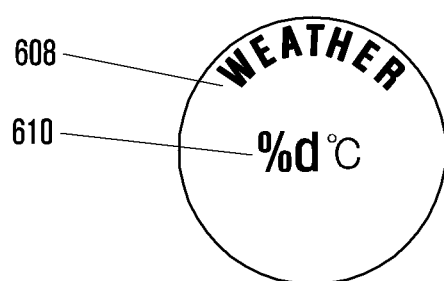
FIG. 6A, FIG. 6B, FIG. 6C and FIG. 6D illustrate displaying weather information on the basis of a watch screen according to various embodiments of the present disclosure.
Figure 6A:
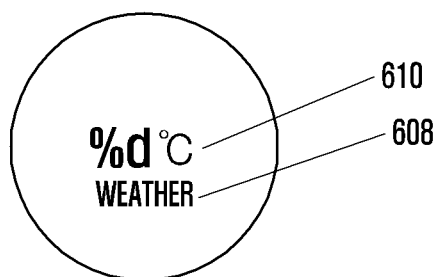
Figure 6A:
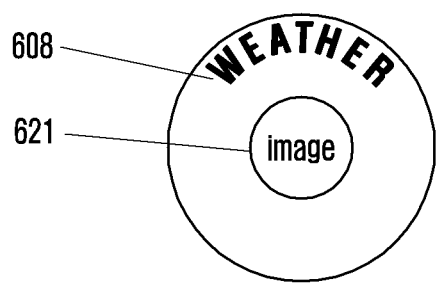
Figure 6A:
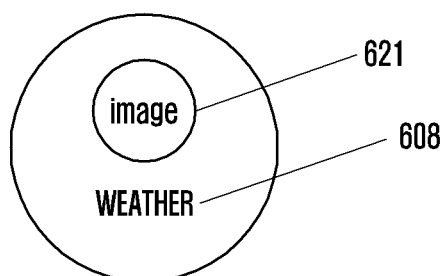
Figure 6A:
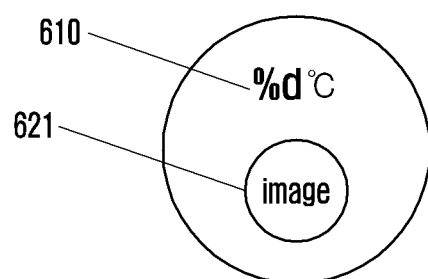
Figure 6A:
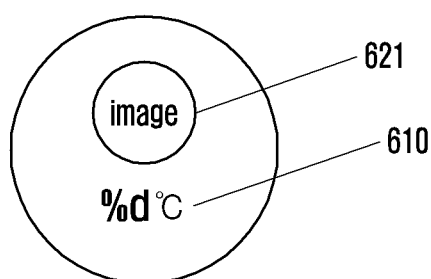

Referring to FIG. 6A, illustrates block diagrams 601 to 606 of various "weather icons" displaying weather information. Here, although the wording "WEATHER" 608 is displayed in order to identify that the corresponding icon is a "weather icon", the present disclosure is not limited thereto. Icons 601 to 606 may include a text and a "weather image" 621 (such as clouds to indicate dowdy conditions, clouds with rain, to indicate rain, clouds with snow to indicate snow, a thunderbolt to indicate storms, a sun and clouds to indicate a partly cloudy condition, and a sun to indicate "sunny conditions"). The icon 601 has a circular shape and includes the wording "WEATHER" 608 displayed at an uppermost end of the interior of a circle and a temperature displayed using a number is displayed at the center of the circle together with a unit, 610. Further, icon 602 is similar to the icon 601, but the wording "WEATHER" 608 is displayed below a temperature which is displayed using a number 610. The controller 210 may maintain a current temperature which is updated in real-time or may periodically update the temperature on the basis of a setting of a user. The icons of pictures 603 and 604 are illustrated while including a "weather image" 621 instead of the temperature which is displayed in icon 601 and icon 602 using a number. Here, the "weather image" 621 may be changed in accordance with a setting of a developer and a user. For example, the "weather image" 621 may be on of images illustrated to identify a sunny day, a cloudy day, a clear day, a rainy day, a snowy day, a foggy day, etc. The controller 210 can display the "weather image" 621 instead of an accurate temperature to provide a current weather state to a user. The icons 605 and 606 illustrate the "weather image" 621 and the temperature 610 together.

Figure 6B:
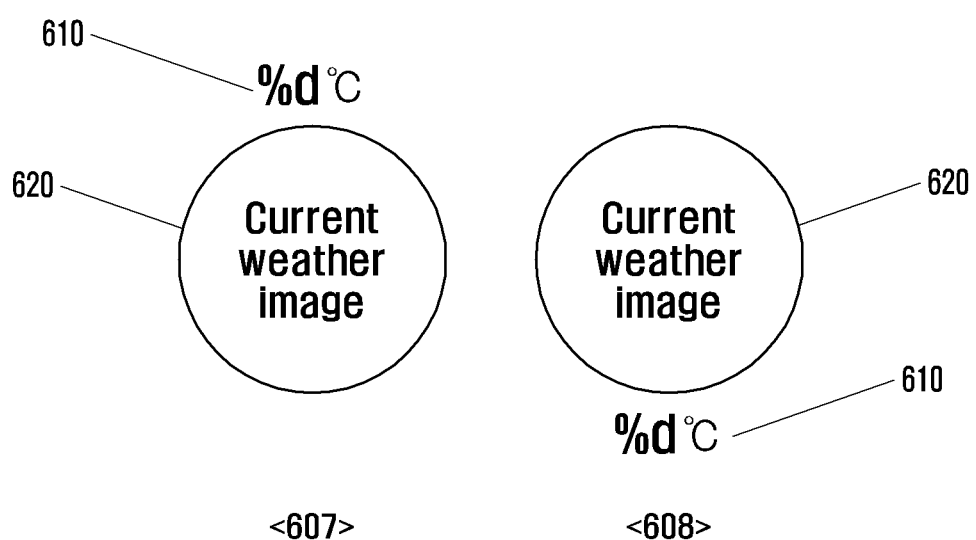

Referring to FIG. 6B, icons 607 and 608 may be an enlarged version of icon 605 and 606. The icon 607 illustrates a current weather state indicator 620 of a place where the wearable electronic device 100 is located, as the "weather image" 620, and illustrates a current temperature 610 at the upper end of the "weather image" 620. Further, the icon of picture 608 illustrates a current temperature 610 at a lower end of the "weather image" 620.

Figure 6C:
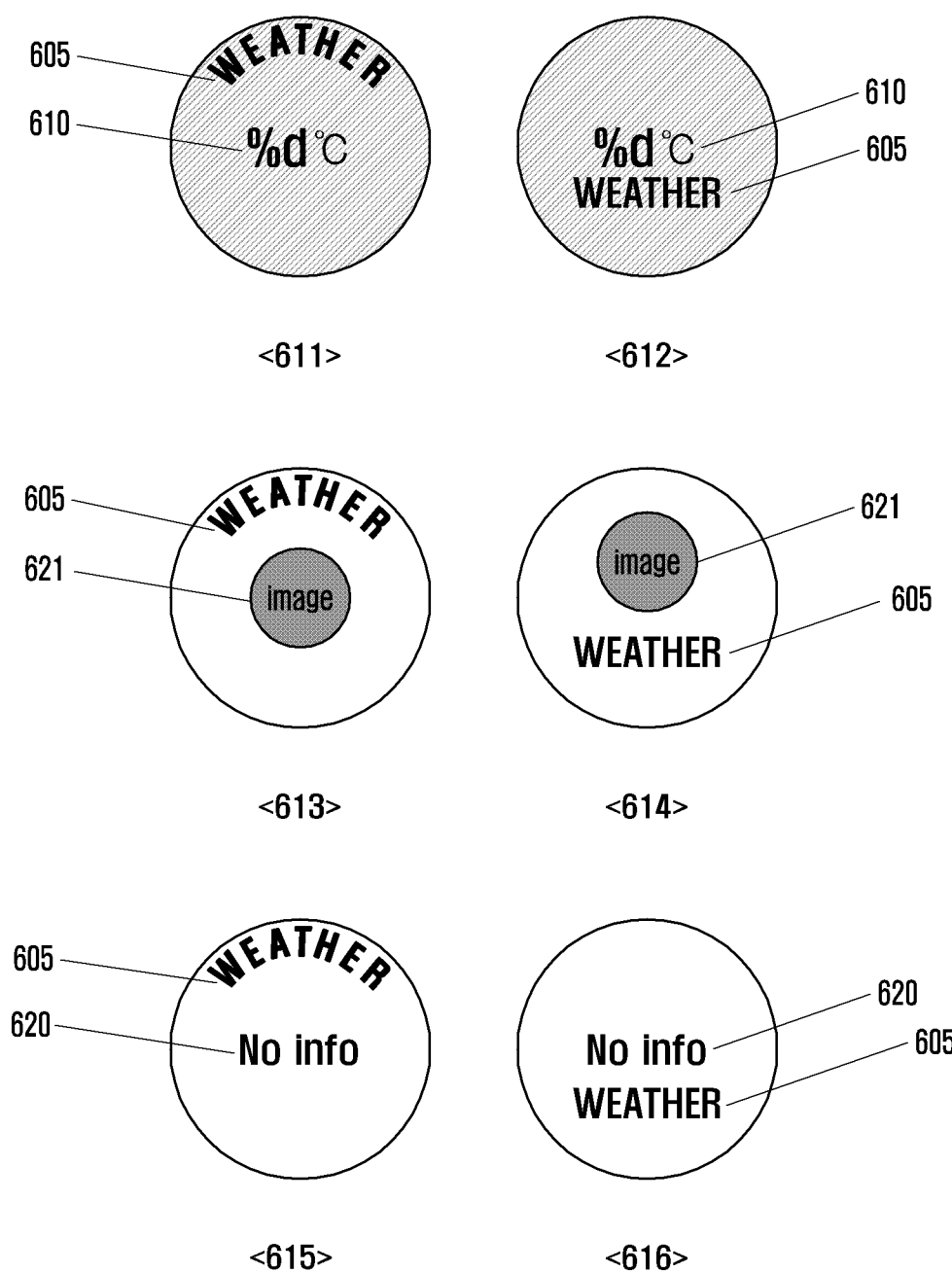

Referring to FIG. 6C, icons 611 to 616 may be shapes of icons displayed when the controller 210 cannot receive weather information. For example, when the weather information cannot be received, the wearable electronic device 100 cannot identify a current temperature or a current location. The icons 611 and 612 illustrate that the icons 601 and 602 are deactivated. For example, the controller 210 can display the deactivated icons by changing colors of the icons 621 or the wordings included in the icons. The icons 613 and 614 illustrate that the icons 603 and 604 are deactivated. In detail, the icons of 613 and 614 illustrate the deactivated icon by changing a color of the "weather image" 621 illustrated in picture 603 and picture 604. The icons of picture 615 and picture 616 illustrate that the wearable electronic device 100 cannot currently receive weather information, by changing a part where the "weather image" 621 is displayed in picture 613 and picture 614 to the wording "No info" 620.

Figure 6D:
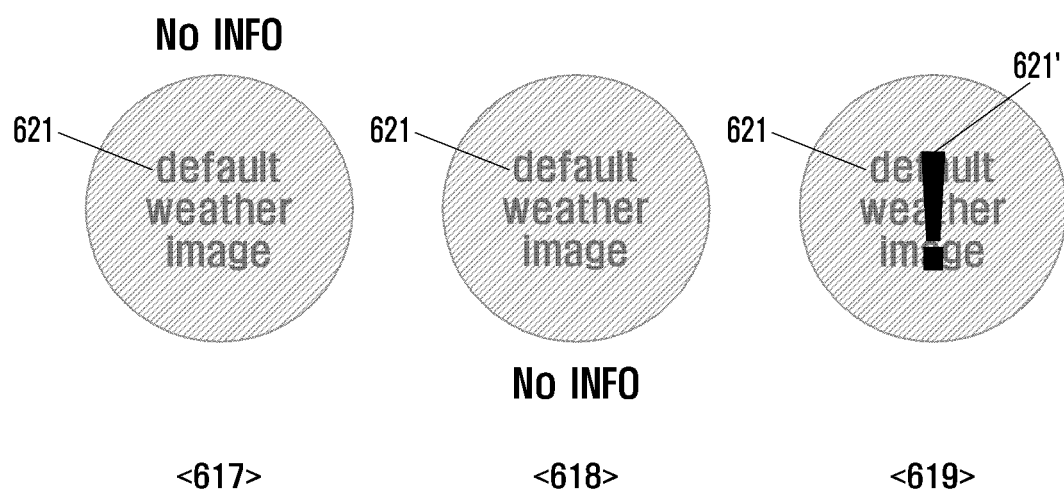

Referring to FIG. 6D, icons 617 to 619 may be shapes of icons displayed when the controller 210 cannot receive weather information. Icons 617 to 619 illustrate deactivated icons while displaying a predetermined "weather image" 621. The deactivated icons may be icons displayed by changing a color, a shadow, etc. of the "weather image". Further, the icons of picture 617 and picture 618 additionally illustrate the wording "NO INFO" at an upper end and a lower end of the "weather image" 621 together with the "weather image" 621 changed to a deactivated icon. The icon of picture 619 additionally illustrates the mark "!" 621' above the "weather image" changed to the deactivated icon.

FIGS. 7A and 7B illustrate various examples for displaying heath information on the basis of a watch screen according to various embodiments of the present disclosure.

Referring to FIG. 7A, there are illustrated block diagrams of various types of "health icons" 701 to 707 displaying health information. Here, the "health icon" may be an icon which displays the number of steps measured by the controller 210 in a gauge form or a number. Icons of pictures 701 to 707 have the wording "STEPS" 720 displayed therein, to identify that the corresponding icons are the "health icon", but the present disclosure is not limited thereto. The icons 701 to 703 having a gauge form 725, and additionally illustrate the wording "STEPS" 720 to identify that the icons are the "health icon". The icons 701 and 702 are displayed in a form of a gauge 725 of 360 degrees having a circular shape, and the gauge may be schematized from a start point 730 to a target point 735. The icon of picture 703 is displayed in a form of a gauge 725' of 180 degrees having a semi-circular shape, and the gauge may be schematized from a start point 730' to a target point 735'. For example, when the target point is ten thousand steps, the gauge is illustrated while numerical values from 0 to 10000 are proportionally divided.

The icons 704 and 705 may be icons in which the number 740 of steps is displayed in a circular shape in a number. The icons of picture 704 and picture 705 also illustrate the wording "STEPS" 720 at an upper end and a lower end of the number of steps to identify that the corresponding icons are the "health icon". The icons 706 and 707, which are obtained by modifying the icons 701 and 704, illustrate a time point when measuring of the number of steps is temporarily stopped. When the number of steps of a user is measured and then temporarily stopped, the controller 210 can change and display a color of the "health icon" to allow the user to identify the stopping. The controller 210 can modify a shadow of the "health icon" or change a color of the "health icon" according to a setting of a developer and a user. Although not illustrated, when the measuring of the number of steps is reset, the controller 210 can display the number of steps displayed in a number, as "0", and display the number of steps displayed in a gauge by changing a gauge bar to one end implying "0". Further, although not illustrated, the controller 210 can identity a body value of a user such as the heart rates of a user and change a color of the "health icon" in accordance with a predetermined body value of a user. For example, when the body value of a user is smaller than a threshold value, the controller 210 can display the "health icon" in a green color. However, when the body value of a user is equal to or larger than the threshold value, the controller 210 can perform a notification message function for allowing a user to stop exercise by displaying the "health icon" in a red color.

Referring to FIG. 7B, pictures 711 to 713 illustrate various types of "health icons" displaying health information. The icons of pictures 711 to 713 distinguishably illustrate a "health image" 745 and the number of steps 740, which is different from the above-described case of pictures 701 to 707. For example, icons 711 and 712 illustrate a predetermined "health image" 745 and additionally illustrate the number of steps above and below the "health image". Icon 713 illustrates the number of steps by changing a color thereof when measuring of the number of steps is temporarily stopped in a state in which the icon 711 is displayed. Although not illustrated, the icons 711 to 713 illustrate the number of steps by changing the number of steps to "0" when the measuring of the number of steps is reset. Further, the icons 711 to 713 may also illustrate the "health image" by changing a color thereof on the basis of a body value of a user, which is identical to the icons of pictures 701 to 707.

FIGS. 8A and 8B illustrate various examples for displaying dual watch information on the basis of a watch screen according to various embodiments of the present disclosure.

Referring to FIG. 8A, there are illustrated block diagrams of various types of "watch icons" 801 to 807 displaying dual watch information. Here, the "watch icon" may be an icon generated on the basis of a dual watch application mapped to a watch application separately from the watch application. Icons 801 to 806 illustrate the wording "CITY NAME" 810 which is a city name of the corresponding watch, to identify that icons thereof are a "watch icon", but the present disclosure is not limited thereto. Here, the wording "CITY NAME" 810 may be changed to an actual city name corresponding to a watch displayed in the "watch icon" and then displayed. The icons 801 and 802 illustrate a watch of a city predetermined in a circular icon and a name 810 of the corresponding city together. The icon of picture 801 has a city name 810 displayed at an upper end of the interior of the icon, and the icon of picture 802 has a city name 810 displayed at a lower end of the interior of the icon. The icons of picture 803 and picture 804 additionally illustrate a day/night image 815 for distinguishing day and night, in the interior of the icon. For example, the controller 210 can make a control to configure a time period from 6 A.M. to 6 P.M. as a day time and display a day image during the day time. Further, the controller 210 can make a control to configure a time period from 6 P.M. to 6 A.M. of the next day as a night time and display a night image during the night time. The icons 803 and 804 additionally illustrate day/night images, but in the icons 805 and 806, a color of the interior of the icons is adjusted to be dark, so that a user can identify that it is night. The icon of picture 807 illustrates an icon which can add a city when there is no predetermined city. The icon of picture 807 has the wording "ADD CITY" 820 displayed therein, the present disclosure is not limited thereto. The controller 210 can change the icon 807 to a different image in accordance with a setting of a developer and a user. Although not illustrated, city names displayed in the icons of pictures 801 to 806 may not be displayed on the basis of a basic language configured in the wearable electronic device 100.

Referring to FIG. 8B, icons 811 and 812 distinguishably illustrate a city name and a day/night image. For example, when it is difficult to display an accurate time together with the city name 810, the controller 210 can display an icon 811, 812 in which an image 815 by which a day time and a night time can be distinguished and a city name 810. The icon 811 illustrates a day image 815 by which it can be identified that a configured city 810 is in a day time and the configured city name at a lower end of the day image. Further, the icon 812 illustrate a night image 815 by which it can be identified that a configured city 810 is in a night time and the configured city name at an upper end of the night image. Images displayed in the icons 811 and 812 can be selected from a day image or a night image according to a time zone. An icon 813 illustrates a case where a city is not configured in accordance with a "watch icon". An image included in the icon of picture 813 can be changed according to a setting of a developer and a user. Further, the icon of picture 813 has the wording "ADD CITY" 820 displayed therein, the present disclosure is not limited thereto.

FIGS. 9A and 9B illustrate various examples for displaying battery information on the basis of a watch screen according to various embodiments of the present disclosure.

Referring to FIG. 9A, there are illustrated block diagrams of various types of "battery icons" 901 to 904 displaying battery information. Here, the "battery icon" may be an icon displaying a battery amount included in a power source unit (the power source unit 260 in FIG. 2) of the wearable electronic device 100 in a gauge form or a number. Icons 901 to 904 have the wording "BATTERY" 920 displayed therein, to identify that the corresponding icons are the "battery icon", but the present disclosure is not limited thereto. The icons 901 to 903 are icons having a gauge form 925, and have the wording "BATTERY" 920 displayed therein. The icons of pictures 901 and 902 are illustrated in a form of a gauge 925 of 360 degrees having a circular shape. One end of the gauge implies a battery amount of 0% and the other end of the gauge implies a battery amount of 100%. The icon 901 has the wording "BATTERY" displayed above the gauge 925, and the icon of picture 902 has the wording "BATTERY" displayed below the gauge 925. The icon of picture 903 is illustrated in a form of a gauge 925 of 180 degrees having a semi-circular shape, and a battery amount is illustrated in the icon 903 in a gauge bar 925 from 0% to 100%. Although not illustrated, when the battery amount is decreased to be smaller than a predetermined amount, the icons 901 to 903 illustrate the gauge bar 925 or the gauge 925 by changing a color of gradations thereof. When the battery amount is decreased to be smaller than a predetermined amount, a color of the entirety of the icon of picture 904 is changed.

Referring to FIG. 9B, icons 911 and 912 illustrate a battery amount in a number 930 together with a battery image 935. The icon 911 illustrates a battery amount above the battery image 935 in a number, and the icon 912 illustrates a battery amount above the battery image in a number 930. Further, when a battery amount is decreased to be smaller than a predetermined amount, the icon 913 illustrates a battery image 935 in addition to a specific emoticon (e.g. "!"). The icon 913 illustrates a battery amount at below the battery image, but the present disclosure is not limited thereto. When a battery is being charged, an icon 914 illustrates a battery image 935 by adding a specific emoticon indicating that the battery is being charged, to the battery image. The icon 914 illustrates a battery amount at a lower end of the battery image, but the present disclosure is not limited thereto.

Figure 10:
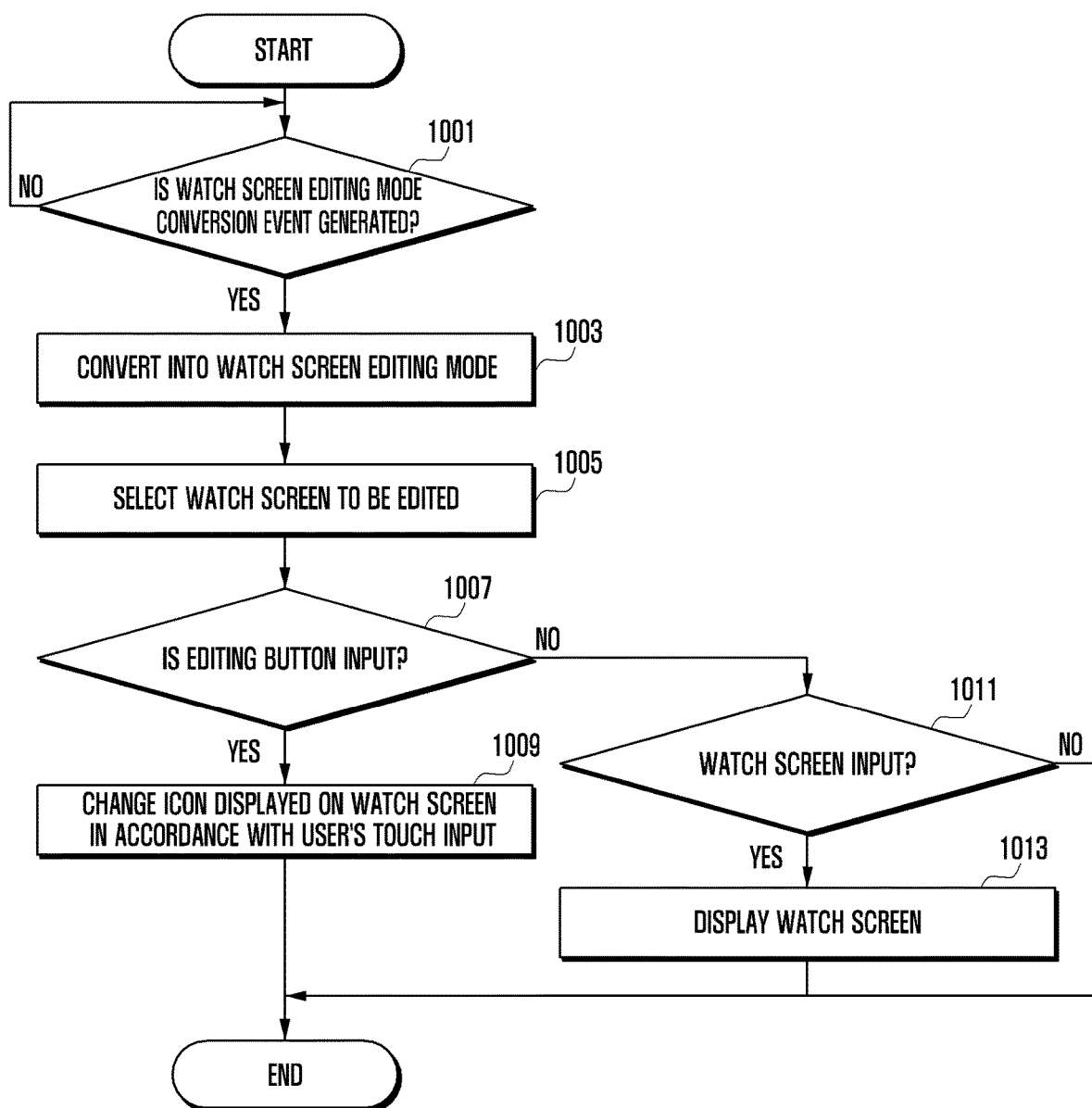
FIG. 10 is a flowchart illustrating a method of editing a configuration of a watch screen according to various embodiments of the present disclosure.

FIG. 10 is a flowchart illustrating a method of editing a configuration of a watch screen according to various embodiments of the present disclosure.

Referring to FIG. 10, in operation 1001, the controller 210 can determine whether a watch screen editing mode conversion event is generated. For example, the controller 210 of the wearable electronic device 100 can receive a user's touch input from the touch panel included in the display unit 230. The controller 210 can determine whether the user's touch input is maintained during a predetermined time period. Here, the predetermined time period may be a time period pre-configured by a developer and a user. When the touch input is maintained during a predetermined time period, the controller 210 can convert a screen into a watch screen editing mode, in operation 1003. That is, an action by which a touch input is maintained during a predetermined time period may be the watch screen editing mode conversion event. Here, the watch screen editing mode may be a mode in which a configuration of a watch screen (401 to 406) can be edited. The wearable electronic device 100 can display a plurality of watch screens, such as watch screens 401 to 406 using a watch application stored in the memory 250, and the controller 210 can edit a configuration of the watch screen in the watch screen editing mode. In operation 1005, the controller 210 can select a watch screen 401 to 406 to be edited. The controller 210 can select a watch screen to be edited in the watch screen editing mode. Further, in operation 1007, the controller 210 can determine whether an editing button is input. Here, the editing button, which is a button generated in the watch screen editing mode, may be a button by which a current screen can be converted into a screen for performing editing in accordance with a watch screen to be edited. In operation 1007, when the editing button is selected by a user, the controller 210 can change an icon displayed in the watch screen in accordance with a user's touch input, in operation 1009. That is, the controller 210 can edit a configuration of the watch screen. The watch screen may include a watch through the watch application, a variable icon 420, 430, and fixed icon(s) 440, 450. Further, the controller 210 can change the variable icon 420, 430 and the fixed icon(s) 440, 450 in accordance with a user's touch input. When there are two or more variable icons, 420, 430, the controller 210 can change one variable icon 420 and another variable icon 430 by mapping the one variable icon 420 with the another variable icon 430. For example, when the one variable icon is a "health icon" 701 to 707, and 711 to 713, the controller 210 can make a configuration to display a "weather icon" 801 to 807, 811 to 813 by mapping the "weather icon" to the "health icon". Accordingly, when a user selects one variable icon as the "health icon" 701 to 707, and 711 to 713, the controller 210 of the wearable electronic device 100 can automatically change another variable icon to the "weather icon" and display the "weather icon" 801 to 807, 811 to 813. In operation 1007, when an editing button is not input, the controller 210 can determine whether a watch screen is input not, in operation 1011. In operation 1011, when the watch screen 401 to 406 is input, the controller 210 can display the input watch screen, in operation 1013. The controller 210 can terminate the watch screen editing mode after displaying the watch screen. In operation 1011, when the watch screen is not input, the controller 210 can directly terminate the watch screen editing mode.

Figure 11:
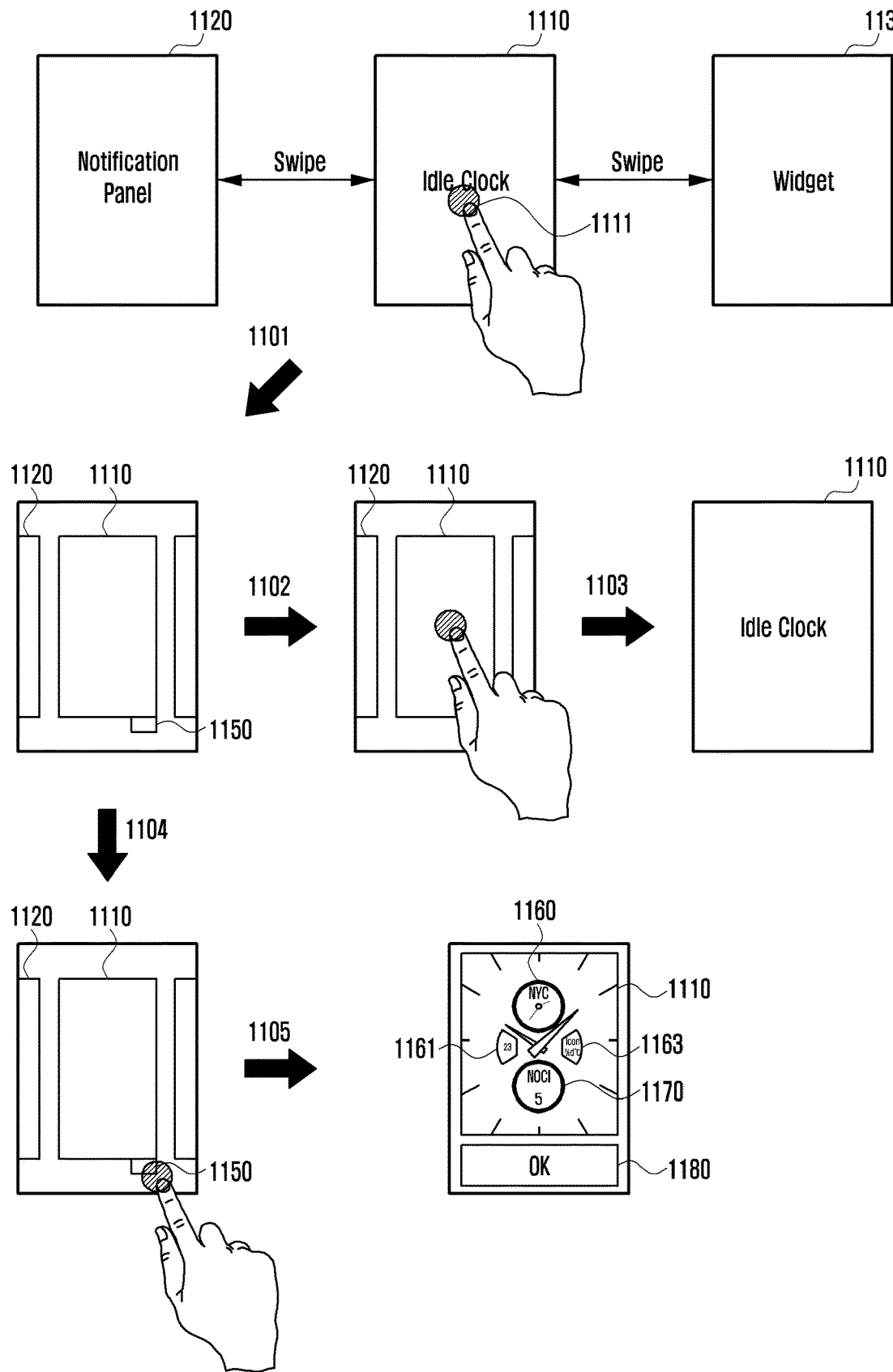
FIG. 11 is a view for describing a method of editing a configuration of a watch screen according to various embodiments of the present disclosure.

FIG. 11 is screen view describing a method of editing a configuration of a watch screen according to various embodiments of the present disclosure.

Referring to FIG. 11, the controller 210 of the wearable electronic device 100 can display various types of screens (e.g. a watch screen 1110, a notification screen 1120, and a widget screen 1130) through the display unit 230. The watch screen 1110, the notification screen 1120, and the widget screen 1130 illustrated in FIG. 11 may be exemplary screens from among screens displayed on the display unit 230 of the wearable electronic device 100. The controller 210 can detect a touch input pushing a screen, and convert a current screen into each screen (e.g. the watch screen 1110, the notification screen 1120, and the widget screen 1130) when the touch input is identified. Further, the controller 210 can detect an event by which a current mode is converted into a watch screen editing mode. For example, the controller 210 can convert a current mode into the watch screen editing mode when a touch input 1111 is consistently detected during a predetermined time period. In operation 1101, the controller 210 can convert a current mode into the watch screen editing mode. Further, the controller 210 can display a screen in the watch screen editing mode through the display unit 230. In the watch screen editing mode, the controller 210 can display the watch screen 1110 and the notification screen 1120 together. Although not illustrated, a user can select a watch screen to be edited in the watch screen editing mode. In operation 1102, the controller 210 can detect a user's touch input corresponding to the watch screen 1110. Further, in operation 1103, the controller 210 can display the watch screen 1110, on which the user's touch input is detected, using the entirety of the display unit 230. That is, when a user touches the watch screen 1110, the controller 210 can convert a current screen from the watch screen editing mode to a general mode again. Meanwhile, in the watch screen editing mode, the controller 210 can detect a user's touch input to an editing button. In operation 1104, the controller 210 can determine that a user's touch input is generated on the editing button 1150. Further, in operation 1105, the controller 210 can edit a configuration of the watch screen 1110. For example, the controller 210 can display two variable icons 1160 and 1170, two fixed icons 1161 and 1163, and an editing completion button 1180 on the display unit 230 to edit the configuration of the watch screen 1110. Here, the two variable icons 1160 and 1170 can be displayed in a color or a graphical form different from that of the existing watch screen 1110, in order to indicate that editing can be performed. For example, the two variable icons 1160 and 1170 may be displayed in a red color or a different shadow effect to be distinguished from the surroundings. Otherwise, the two variable icons 1160 and 1170 can be largely enlarged and displayed. Further, the controller 210 can change the two variable icons 1160 and 1170 on the basis of a user's touch input. Here, the two variable icons 1160 and 1170 can be classified into a first variable icon 1160 and a second variable icon 1170. Locations of the first variable icon 1160 and the second variable icon 1170 may be exchanged, and is not limited to the drawing. The first variable icon 1160 is changed in response to a user's toggle input, and a user can configure the second variable icon 1170 to be automatically displayed when the first variable icon 1160 is selected. For example, when a "health icon" is selected as the first variable icon 1160, the controller 210 can automatically select the "weather icon" as the second variable icon 1170 according to setting of a developer and a user. That is, when the first variable icon 1160 is selected, the controller 210 can select and display the second variable icon 1170 mapped to the first variable icon 1160 according to setting. When there are two or more second variable icons 1170 mapped to the first variable icon 1160, the controller 210 can firstly display the second variable icon having a high priority on the basis of a predetermined priority. At this time, the second variable icon having a low priority can be changed when a toggle input is generated in the second variable icon 1170.

Figure 12:
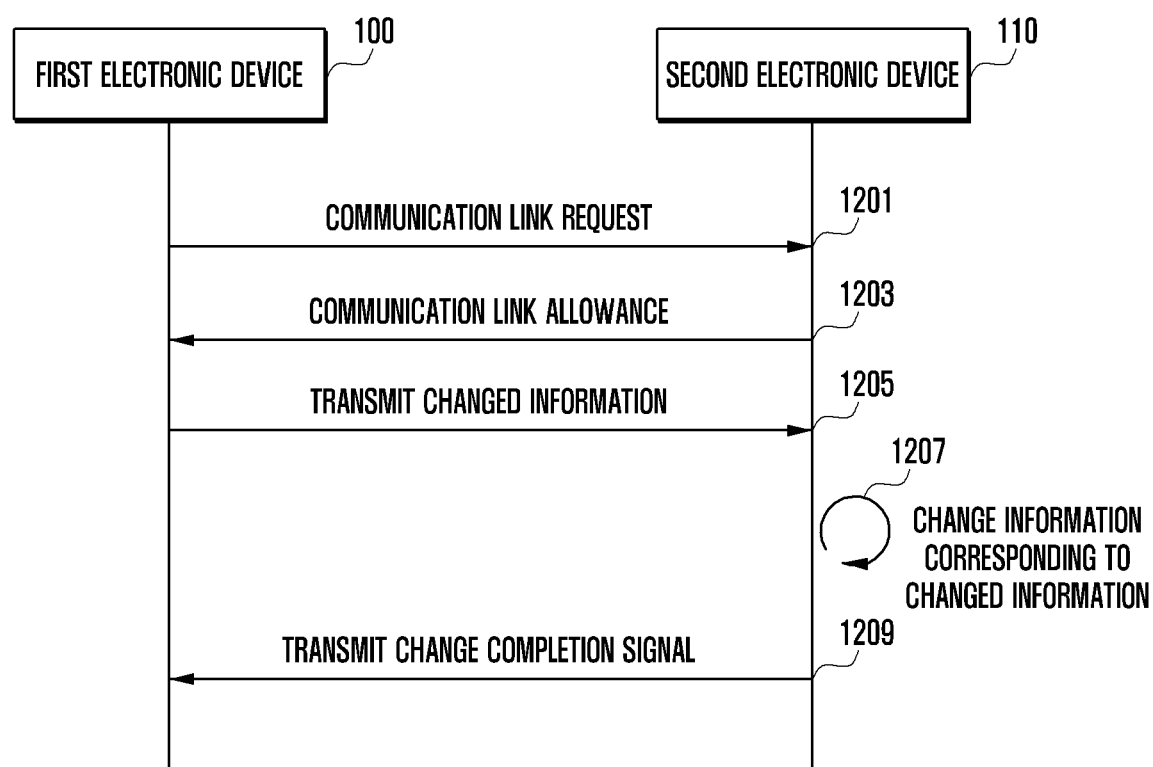
FIG. 12 is a view for describing a method of sharing information between a first electronic device and a second electronic device according to various embodiments of the present disclosure.

FIG. 12 is an exemplary view for describing a method of sharing information between a first electronic device and a second electronic device according to various embodiments of the present disclosure.

Referring to FIG. 12, a first electronic device 1210 and a second electronic device 1220 can share information with each other while being communicably linked to each other. Here, the first electronic device 1210 may be the wearable electronic device 100, and the second electronic device 1220 may be the portable electronic device 110. However, the first electronic device 1210 and the second electronic device 1210 are not limited to the wearable electronic device 100 and the portable electronic device 110. The first electronic device 1210 (e.g. the wearable electronic device 100) and the second electronic device 1220 (e.g. the portable electronic device 110) can share information stored in a memory (e.g. the memory in FIG. 2) of the first electronic device 1210 with each other. The portable electronic device 110 according to the related art can request a communication link from the wearable electronic device 100 and can control the wearable electronic device 100 connected thereto. When it is possible to communicably link the wearable electronic device 100 to the portable electronic device 110, the wearable electronic device 100 according to various embodiments of the present disclosure can be communicably linked to the portable electronic device 110 to receive changed information from the portable electronic device 110 or transmit changed information to the portable electronic device. When it is impossible to communicably link the wearable electronic device 100 to the portable electronic device 110, the wearable electronic device 100 can be communicably linked directly connected to the server 120 using the embedded SIM card 221. The wearable electronic device 100 can receive information from the server 120 to change the information stored in the memory 250. Further, when it is possible to communicably link the wearable electronic device 100 to the portable electronic device 110, the wearable electronic device 100 can transmit the changed information to the portable electronic device 110 to share the information with the portable electronic device 110. FIG. 12 is a view sequentially illustrating operations of transmitting changed information to the portable electronic device 110 (second electronic device 1220) to share the changed information with the portable electronic device 110 by the wearable electronic device 110 (first electronic device 1210).

In operation 1201, the first electronic device 1210 can request a communication link with the second electronic device 1220. When the second electronic device 1220 can communicate with the first electronic device 1210, the second electronic device 1220 can permit the communication link request of the first electronic device 1210, in operation 1203. For example, a communicable state may be a state in which the first electronic device 1210 and the second electronic device 1220 are switched on and located within a short distance. When the communication link with the second electronic device is permitted in operation 1203, the first electronic device 1210 can transmit changed information to the second electronic device 1220. Here, the changed information may be information received from the server by the first electronic device 1210 or information changed by the first electronic device according to a setting of a user. Further, in operation 1207, the second electronic device 1220 can change information corresponding to the information received from the first electronic device 1210. In operation 1209, the second electronic device 1220 can transmit a change completion signal to the first electronic device 1210.

Further, when the first electronic device 1210 is the wearable electronic device 100 and the second electronic device 1220 is the server (the server 120 in FIG. 1), the first electronic device 1210 can share changed information with the server. The first electronic device 1210 can have a SIM card autonomously embedded therein and can directly communicate with the server through the SIM card. The first electronic device 1210 can have a SIM card autonomously embedded therein and can directly communicate with the server through the SIM card.

The transmitted changed information can include a variety of information, including, but not limited to, weather information and changes that are displayed in weather icons 601-608, and 611-619, health information displayed in health icons 701-707, and 711-713, the time and daylight conditions at a given city for display in dual watch icons 801-807, and 811-813.

According to various embodiments, at least some of the devices (for example, modules or functions thereof) or the method (for example, operations) according to the present disclosure may be implemented by a command stored in a computer-readable storage medium in a programming module form. When the command is executed by one or more processors, the one or more processors may perform a function corresponding to the command. The computer-readable storage medium may be, for example, the memory 260. At least some of the programming modules may be implemented (for example, executed) by, for example, the processor. At least a part of the programming module may, for example, include a module, a program, a routine, a set of instructions, or a process for performing at least one function.

The computer-readable recording medium may include magnetic media such as a hard disk, a floppy disk, and a magnetic tape, optical media such as a Compact Disc Read Only Memory (CD-ROM) and a Digital Versatile Disc (DVD), magneto-optical media such as a floptical disk, and hardware devices specially configured to store and perform a program instruction (for example, programming module), such as a Read Only Memory (ROM), a Random Access Memory (RAM), a flash memory, or dedicated hardware such as an ASIC or FPGA, and the like. In addition, the program instructions may include high class language codes, which can be executed in a computer by using an interpreter, as well as machine codes made by a compiler. The aforementioned hardware device may be configured to operate as one or more software modules in order to perform the operation of various embodiments of the present disclosure, and vice versa. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, or a combination hardware configured with machine executable code and may be performed in whole or in part within the programmed instructions of a computer. No claim element herein is to be construed under the provisions of 35 U.S.C. 112, sixth paragraph, unless the element is expressly recited using the phrase "means for".

In addition, an artisan understands and appreciates that a "processor" or "microprocessor" constitute hardware in the claimed invention. Under the broadest reasonable interpretation, the appended claims constitute statutory subject matter in compliance with 35 U.S.C. § 101.

The functions and process steps herein may be performed automatically or wholly or partially in response to user command. An activity (including a step) performed automatically is performed in response to executable instruction or device operation without user direct initiation of the activity.

The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. § 101 and does not constitute software per se.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive manner. Further, some operations may be executed according to another order or may be omitted, or other operations may be added.

Meanwhile, the exemplary embodiments disclosed in the specification and drawings are merely presented to easily describe technical contents of the present disclosure and help the understanding of the present disclosure and are not intended to limit the scope of the present disclosure. Therefore, all changes or modifications derived from the technical idea of the present disclosure as well as the embodiments described herein should be interpreted to belong to the scope of the present disclosure.

What is claimed is:

1. A wearable device comprising:
a display;
at least one processor; and
a memory configured to store instructions which, when executed by the at least one processor, cause the at least one processor to:

control the display to display a watch screen indicating time and including a first icon associated with a first application of a plurality of applications, in response to a first user input on the watch screen, control the display to display a first user interface including a reduced-size version of the watch screen, at least a portion of a first user interface item for selecting another watch screen to be displayed on the display from a plurality of watch screens, and a second user interface item for configuring the watch screen or the other watch screen, wherein the first user interface item is a reduced-sized version of the other watch screen such that the second user interface item is displayed in a portion of the display outside portions of the display displaying the reduced-size version of the watch screen and the first user interface item, in response to a second user input on the second user interface item to configure the other watch screen, control the display to display a second user interface including a second icon associated with a second application of the plurality of applications, and in response to a third user input for selecting a third icon associated with a third application of the plurality of applications, control the display to display the third icon in place of the second icon in the second user interface, wherein the reduced-size version of the watch screen is an entirety of the watch screen scaled by a scaling factor, and the reduced-sized version of the other watch screen is an entirety of the other watch screen scaled by the scaling factor.

2. The wearable device of claim 1, wherein the first user input is a touch input held on the display for more than a predetermined time period.

3. The wearable device of claim 1, wherein the memory is configured to store additional instructions which, when executed by the at least one processor, cause the at least one processor to:
in response to receiving an update event related to the first application, adjust at least one attribute of the first icon displayed in the watch screen according to the update event.

4. The wearable device of claim 3, wherein the at least one attribute of the first icon is at least one of an image displayed on the first icon, a color of the first icon, and text or number information displayed on the first icon.

5. The wearable device of claim 1,
wherein the third user input comprises a toggle input, and
wherein the second icon is changed to the third icon per one toggle input.

6. The wearable device of claim 1, wherein the memory is configured to store additional instructions which, when executed by the at least one processor, cause the at least one processor to:
change, in response to occurrence of information update of the first application of a plurality of applications, the first icon to indicate the information update of the first application.

7. The wearable device of claim 1, wherein the first icon is a "notification icon" displaying reception information of a message, a "weather icon" displaying weather information, a "health icon" displaying health information of a user, a "dual watch icon" displaying time of a location that is different from a current location of the wearable device, or a "battery icon" displaying a residual battery amount of the wearable device.

8. The wearable device of claim 1, wherein the memory is configured to store additional instructions which, when executed by the at least one processor, cause the at least one processor to:
- determine at least one first additional icon to be displayed in the watch screen, wherein the at least one first additional icon is mapped to the first icon as another component of the watch screen based on an icon category of the first icon; and
- display the watch screen including the first icon and the at least one first additional icon.

9. The wearable device of claim 8, wherein:
- the at least one first additional icon comprises two or more icons, and
- while the first icon is displayed, the two or more icons are displayed in a sequence based on a predetermined priority.

10. The wearable device of claim 8, wherein the memory is configured to store additional instructions which, when executed by the at least one processor, cause the at least one processor to:
- in response to a fourth user input to switch display of the first icon to a fourth icon, determine at least one second additional icon, wherein the at least one second additional icon is mapped to the fourth icon as another component of the watch screen based on an icon category of the fourth icon; and
- display the watch screen including the fourth icon and the at least one second additional icon, wherein the fourth icon and the at least one second additional icon replace the first icon and the at least one first additional icon.

11. The wearable device of claim 10, wherein the watch screen further comprises a fixed icon that is unresponsive to the fourth user input.

12. The wearable device of claim 1, wherein the memory is configured to store additional instructions which, when executed by the at least one processor, cause the at least one processor to:
- install a new application in the wearable device;
- set the new application based on a predetermined icon category; and
- generate a new icon corresponding to the installed new application.

13. The wearable device of claim 1, wherein the memory is configured to store additional instructions which, when executed by the at least one processor, cause the at least one processor to:
- receive information update related to the first application from another electronic device, and
- update the first icon corresponding to the first application based on the received information update.

14. A method of a wearable device comprising:
- controlling a display of the wearable device to display a watch screen indicating time and including a first icon associated with a first application of a plurality of applications;
- in response to a first user input on the watch screen, controlling the display to display a first user interface including a reduced-size version of the watch screen, at least a portion of a first user interface item for selecting another watch screen to be displayed on the display from a plurality of watch screens, and a second user interface item for configuring the watch screen or the other watch screen, wherein the first user interface item is a reduced-sized version of the other watch screen such that the second user interface item is displayed in a portion of the display outside portions of the display displaying the reduced-size version of the watch screen and the first user interface item;
- in response to a second user input on the second user interface item to configure the other watch screen, controlling the display to display a second user interface including a second icon associated with a second application of the plurality of applications; and
- in response to a third user input for selecting a third icon associated with a third application of the plurality of applications, controlling the display to display the third icon in place of the second icon in the second user interface,
- wherein the reduced-size version of the watch screen is an entirety of the watch screen scaled by a scaling factor, and the reduced-sized version of the other watch screen is an entirety of the other watch screen scaled by the scaling factor.

15. The method of claim 14, wherein the first user input is a touch input held on the display for more than a predetermined time period.

16. The method of claim 14, further comprising:
- in response to receiving an update event related to the first application, adjusting at least one attribute of the first icon displayed in the watch screen according to the update event.

17. The method of claim 16, wherein the at least one attribute of the first icon is at least one of an image displayed on the first icon, a color of the first icon, and text or number information displayed on the first icon.

18. The method of claim 14, wherein the first icon is a "notification icon" displaying reception information of a message, a "weather icon" displaying weather information, a "health icon" displaying health information of a user, a "dual watch icon" displaying time of a location that is different from a current location of the wearable device, or a "battery icon" displaying a residual battery amount of the wearable device.

19. The method of claim 14, further comprising:
- determining at least one first additional icon to be displayed in the watch screen, wherein the at least one first additional icon is mapped to the first icon as another component of the watch screen based on an icon category of the first icon; and
- displaying the watch screen including the first icon and the at least one first additional icon.

20. The method of claim 19, further comprising:
- in response to a fourth user input to switch display of the first icon to a fourth icon, determining at least one second additional icon, wherein the at least one second additional icon is mapped to the fourth icon as another component of the watch screen based on an icon category of the fourth icon; and
- displaying the watch screen including the fourth icon and the at least one second additional icon, wherein the fourth icon and the at least one second additional icon replace the first icon and the at least one first additional icon.

* * * * *